(12) United States Patent
Chen et al.

(10) Patent No.: US 12,174,908 B2
(45) Date of Patent: Dec. 24, 2024

(54) METHOD, ELECTRONIC DEVICE AND STORAGE MEDIUM FOR CONVOLUTION CALCULATION IN NEURAL NETWORK

(71) Applicant: Nanjing Horizon Robotics Technology Co., Ltd., Nanjing (CN)

(72) Inventors: Liang Chen, Beijing (CN); Chang Huang, Beijing (CN); Kun Ling, Beijing (CN); Jianjun Li, Beijing (CN); Delin Li, Beijing (CN); Heng Luo, Beijing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 1121 days.

(21) Appl. No.: 16/222,699

(22) Filed: Dec. 17, 2018

(65) Prior Publication Data

US 2019/0188237 A1   Jun. 20, 2019

(30) Foreign Application Priority Data

Dec. 18, 2017  (CN) .......................... 201711361968.7

(51) Int. Cl.
*G06F 17/15*  (2006.01)
*G06N 3/04*  (2023.01)
(Continued)

(52) U.S. Cl.
CPC .............. *G06F 17/15* (2013.01); *G06N 3/04* (2013.01); *G06N 3/063* (2013.01); *G06N 3/045* (2023.01)

(58) Field of Classification Search
CPC ......... G06F 17/15; G06F 17/153; G06N 3/04; G06N 3/063; G06N 3/0454; G06N 3/08
See application file for complete search history.

(56) References Cited

U.S. PATENT DOCUMENTS 11,182,668 B2 * 11/2021 Martin ................. G06N 3/0481
2015/0170020 A1    6/2015 Garimella
(Continued)

FOREIGN PATENT DOCUMENTS

CN    106339753 A    1/2017
CN    106355244 A    1/2017
(Continued)

OTHER PUBLICATIONS

Li, ( A High Performance FPGA-based Accelerator for Large-Scale Convolutional Neural Networks), Sep. 2, 2016 (Year: 2016).*
(Continued)

*Primary Examiner* — Alexey Shmatov
*Assistant Examiner* — Beatriz Ramirez Bravo
(74) *Attorney, Agent, or Firm* — K&L Gates LLP

(57) ABSTRACT

Disclosed is a method for convolution calculation in a neural network, comprising: reading an input feature map, depthwise convolution kernels and pointwise convolution kernels from a dynamic random access memory (DRAM); performing depthwise convolution calculations and pointwise convolution calculations by depthwise convolution calculation units and pointwise convolution calculation units, according to the input feature map, the depthwise convolution kernels and the pointwise convolution kernels to obtain output feature values of a first predetermined number p of points on all pointwise convolution output channels; storing the output feature values of a first predetermined number p of points on all pointwise convolution output channels into an on-chip memory; and repeating above operation to obtain output feature values of all points on all point wise convolution output channels. Therefore, the storage space for storing intermediate results may be reduced.

14 Claims, 12 Drawing Sheets

(51) Int. Cl.
*G06N 3/063* (2023.01)
*G06N 3/045* (2023.01)

(56) References Cited

U.S. PATENT DOCUMENTS

2017/0286830 A1\* 10/2017 El-Yaniv ............... G06N 3/0454
2018/0137406 A1\* 5/2018 Howard ............... G06N 3/0454

FOREIGN PATENT DOCUMENTS

| CN | 106951962 A | | 7/2017 |
| CN | 107451654 A | | 12/2017 |
| JP | 2020513637 A | \* | 5/2020 |

OTHER PUBLICATIONS

Chinese Search Report for Application No. CN201711361968.7, dated Sep. 26, 2019, 3 pages.
Japanese Office Action for Application No. JP2018-236273, dated Dec. 16, 2019, 3 pages.
Ma et al., Optimizing loop operation and dataflow in FPGA acceleration of deep convolutional neural networks, FPGA '17, Feb. 22-24, 2017, Monterey, CA, USA, ISBN 978-1-4503-4354-1/17/02 (10 pages).
Andrew G Howard et al: "MobileNets: Efficient Convolutional Neural Networks for Mobile Vision Applications", Arxiv.org, Cornell University Library, 201 Olin Library Cornell University Ithaca, NY 14853, Apr. 17, 2017 (Apr. 17, 2017), XP080763381. (9 pages).
Extended European Search Report for Application No. 18213279.5, dated Apr. 29, 2019, 12 pages.
Francois Chollet Google et al: "Xception: Deep Learning with Depthwise Separable Convolutions", Apr. 4, 2017 (Apr. 4, 2017), XP055500078, Retrieved from the Internet: URL:https://arxiv.org/pdf/1610.02357.pdf [retrieved on Aug. 15, 2018] (8 pages).
Huimin Li et al: "A high performance FPGA-based accelerator for large-scale convolutional neural networks", 2016 26th International Conference On Field Programmable Logic and Applications (FPL), EPFL, Aug. 29, 2016 (Aug. 29, 2016), pp. 1-9, XP032971527, DOI: 10.1109/FPL.2016.7577308, [retrieved on Sep. 26, 2016].
Zhang Chen et al: "Caffeine: Towards uniformed representation and acceleration for deep convolutional neural networks", 2016 IEEE/ACM International Conference On Computer-Aided Design (ICCAD), ACM, Nov. 7, 2016 (Nov. 7, 2016), pp. 1-8, XP033048843, DOI: 10.1145/2966986.2967011 [retrieved on Jan. 19, 2017].

\* cited by examiner

S221

Performing the pointwise convolution calculations according to the intermediate feature values of the first predetermined number p of points on all depthwise convolution output channels and weight values of a fourth predetermined number n of pointwise convolution kernels on all pointwise convolution channels, respectively, to obtain output feature values of the first predetermined number p of points on a fourth predetermined number n of pointwise convolution output channels corresponding to the fourth predetermined number n of pointwise convolution kernels

S222

Repeating the above operations, until obtaining output feature values of the first predetermined number p of points on all pointwise convolution output channels

Performing the pointwise convolution calculations according to intermediate feature values of the first predetermined number p of points on third predetermined number m' of depthwise convolution output channels and weight values on the corresponding third predetermined number m' of pointwise convolution channels in all pointwise convolution kernels, respectively, to obtain the current pointwise convolution partial sums of the first predetermined number p of points on all pointwise convolution output channels

S224

Respectively performing accumulation calculations on the current pointwise convolution partial sums of the first predetermined number p of points on all pointwise convolution output channels and previous accumulation calculation results of the first predetermined number p of points, to generate current accumulation calculation results of the first predetermined number p of points

S225

Repeating the above operations, until the pointwise convolution calculations and accumulation calculations are completed on all of the intermediate feature values of the first predetermined number p of points on all depthwise convolution output channels

FIG. 11

METHOD, ELECTRONIC DEVICE AND STORAGE MEDIUM FOR CONVOLUTION CALCULATION IN NEURAL NETWORK

TECHNICAL FIELD OF THE DISCLOSURE

The present disclosure relates to the technical field of neural network, and more particularly to a method and an electronic device for convolution calculation in a neural network.

BACKGROUND

Deep learning technology based on convolutional neural network may be used for image recognition and detection, speech recognition and so on with high accuracy, so it is widely used in the fields of safety monitoring, auxiliary driving, intelligent companion robot, intelligent medical treatment and so on.

Since the convolutional neural network is operation intensive, reducing parameters amount and calculation amount of neural network has become a hot direction in current research. A Mobile network (i.e. MobileNet) is a latest special convolutional neural network, which reduces the calculation amount by decomposing the traditional three-dimensional convolution operation into two convolution operations, i.e. depthwise convolution and pointwise convolution, while the calculation accuracy is little different from that of the traditional convolution.

SUMMARY

Regarding the existing implementation solution of MobileNet, whether it is based on a general purpose processor (CPU), a dedicated mapics processor (GPU), or a dedicated processing chip, it is necessary to firstly calculate the output of depthwise convolution operation, and then take them as input data of the pointwise convolution operation, and then perform calculations.

The disadvantage of this approach is that when the data amount of input and output is relatively large, a larger on-chip random access memory (SRAM) is required for buffering intermediate results. However, a size of on-chip SRAM is fixed. If the size of on-chip SRAM is insufficient to buffer the intermediate results, it is necessary to split the depthwise convolution operation into multiple calculations and write each calculation result into off-chip memory (DDR) until the calculation results of the depthwise convolution operation are completely calculated and written into the off-chip memory (DDR), and then read these results out of DDR in batches and perform pointwise convolution calculations. Obviously, this will place a huge burden on the limited data transmission bandwidth and lead to an increase in system power consumption.

In order to solve the above technical problem, the present disclosure is proposed. A method and an electronic device convolution calculation in a neural network which may reduce a storage space for storing intermediate results are provided in embodiments of the present disclosure.

According to an aspect of the present disclosure, disclosed is a method for convolution calculation in a neural network comprising: reading an input feature map, depthwise convolution kernels and pointwise convolution kernels from a dynamic random access memory (DRAM); performing the depthwise convolution calculations and pointwise convolution calculations by depthwise convolution calculation units and pointwise convolution calculation units, according to the input feature map, the depthwise convolution kernels and the pointwise convolution kernels to obtain output feature values of a first predetermined number p of points on all pointwise convolution output channels, storing the output feature values of a first predetermined number p of points on all pointwise convolution output channels into an on-chip memory, and repeating above operation to obtain output feature values of all points on all pointwise convolution output channels.

In one embodiment, performing the depthwise convolution calculations and pointwise convolution calculations according to an input feature map, depthwise convolution kernels and pointwise convolution kernels to obtain output feature values of a first predetermined number p of points on all pointwise convolution output channels comprises: performing the depthwise convolution calculations according to the input feature map and the depthwise convolution kernels to obtain intermediate feature values of the first predetermined number p of points on all depthwise convolution output channels; and performing the pointwise convolution calculations according to the intermediate feature values of the first predetermined number p of points on all depthwise convolution output channels and the pointwise convolution kernels, to obtain output feature values of the first predetermined number p of points on all pointwise convolution output channels.

In one embodiment, performing the depthwise convolution calculations and pointwise convolution calculations according to an input feature map, depthwise convolution kernels and pointwise convolution kernels to obtain output feature values of the first predetermined number p of points on all pointwise convolution output channels comprises: performing the depthwise convolution calculations according to the input feature map and the depthwise convolution kernels, to obtain intermediate feature values of the first predetermined number p of points on a second predetermined number m of depthwise convolution output channels; performing the pointwise convolution calculations according to the intermediate feature values of the first predetermined number p of points on the second predetermined number m of depthwise convolution output channels and the pointwise convolution kernels, to obtain a current pointwise convolution partial sums of the first predetermined number p of points on all the pointwise convolution output channels; respectively performing accumulation calculations on the current pointwise convolution partial sums of the first predetermined number p of points on all pointwise convolution output channels and previous accumulation calculation results of the first predetermined number p of points, to generate current accumulation calculation results of the first predetermined number p of points; and repeating above operations, performing the pointwise convolution calculations according to intermediate feature values of the first predetermined number p of points on a next second predetermined number m of depthwise convolution output channels and the pointwise convolution channel, and correspondingly performing subsequent operations, until the pointwise convolution calculations and accumulation calculations are completed on all of intermediate feature values of the first predetermined number p of points on all depthwise convolution output channels, the final accumulation calculation results of the first predetermined number p of points being the output feature values of the first predetermined number p of points on all pointwise convolution output channels.

According to another aspect of the present disclosure, disclosed is an electronic device comprising a processor, and a memory having computer program instructions stored therein, when executed by the processor, making the processor to perform a method for convolution calculation in a neural network comprising: reading an input feature map, depthwise convolution kernels and pointwise convolution kernels from a dynamic random access memory (DRAM); performing depthwise convolution calculations and pointwise convolution calculations by depthwise convolution calculation units and pointwise convolution calculation units, according to the input feature map, the depthwise convolution kernels and the pointwise convolution kernels to obtain output feature values of a first predetermined number p of points on all pointwise convolution output channels; storing the output feature values of a first predetermined number p of points on all pointwise convolution output channels into an on-chip memory; and repeating above operation to obtain output feature values of all points on all pointwise convolution output channels.

According to another aspect of the present disclosure, disclosed is a computer program product comprising computer program instructions, when executed by a processor, making the processor to perform a method for convolution calculation in a neural network comprising: reading an input feature map, depthwise convolution kernels and pointwise convolution kernels from a dynamic random access memory (DRAM); performing depthwise convolution calculations and pointwise convolution calculations by depthwise convolution calculation units and pointwise convolution calculation units, according to the input feature map, the depthwise convolution kernels and the pointwise convolution kernels to obtain output feature values of a first predetermined number p of points on all pointwise convolution output channels; storing the output feature values of a first predetermined number p of points on all pointwise convolution output channels into an on-chip memory; and repeating above operation to obtain output feature values of all points on all pointwise convolution output channels.

According to another aspect of the present disclosure, disclosed is a computer readable and writable storage medium having computer program instructions stored thereon, when executed by a processor, making the processor to perform a method for convolution calculation in a neural network comprising: reading an input feature map, depthwise convolution kernels and pointwise convolution kernels from a dynamic random access memory (DRAM); performing depthwise convolution calculations and pointwise convolution calculations by depthwise convolution calculation units and pointwise convolution calculation units, according to the input feature map, the depthwise convolution kernels and the pointwise convolution kernels to obtain output feature values of a first predetermined number p of points on all pointwise convolution output channels; storing the output feature values of a first predetermined number p of points on all pointwise convolution output channels into an on-chip memory; and repeating above operation to obtain output feature values of all points on all pointwise convolution output channels.

Compared with the prior art, the convolution calculation method in the neural network and the electronic device according to embodiments of the present disclosure may perform depthwise convolution calculations and pointwise convolution calculations according to an input feature map, depthwise convolution kernels and pointwise convolution kernels to obtain output feature values of the first predetermined number p of points on all pointwise convolution output channels, and repeat the above operations to obtain output feature values of all points on all pointwise convolution output channels. Therefore, the storage space for storing intermediate results may be reduced, such that a more efficient convolutional neural network may be realized.

BRIEF DESCRIPTION OF TRE DRAWINGS

The above and other objects, features and advantages of the present disclosure will become more obvious through describing the embodiments of the present disclosure in more detail with reference to accompanying drawings. The drawings are used to provide a further understanding to the embodiments of the present disclosure and constitute a portion of the specification, and the drawings, together with the embodiments of the present disclosure, are used to explain this disclosure and do not constitute restrictions on the disclosure. In the drawings, the same reference number generally refers to the same portion or step.

FIG. 7 shows a flowchart of the step of calculating output feature value of a first predetermined number p of points on all pointwise convolution output channels according to the intermediate feature values and the pointwise convolution kernels according to the first embodiment of the present disclosure.

FIG. 11 shows a flowchart of the step of calculating the output feature value of a first predetermined number p of points on all pointwise convolution output channels according to the intermediate feature values and the pointwise convolution kernels according to the second embodiment of the present disclosure.

DETAILED DESCRIPTION

Hereinafter, an exemplary embodiment according to the present disclosure will be described in detail with reference to the drawings. Obviously, the described embodiments are only a portion of embodiments of the present disclosure and not all the embodiments of the present disclosure, and it should be understood that the present disclosure is not limited by the exemplary embodiment described herein.

SUMMARY OF THE DISCLOSURE

A convolutional neural network may generally include multiple convolutional layers. In each convolutional layer, a convolution kernel of the layer is used to perform convolution operations on the input feature map (also known as input feature data or input feature value) of the layer to obtain an output feature map (also known as output feature data or output feature value) of the layer. In each layer of the convolutional neural network, the input feature map may have a certain width and height, and may have a certain number of channels (also known as depth). Each convolution kernel may have the same (or different) width and height, which are less than (or equal to) the width and height of the input feature map, and may have the same number of channels, which is equal to the number of channels of the input feature map.

As a lightweight neural network, a MobilNet uses the idea of depthwise, separable convolutions, and instead of fusing channels when calculating convolutions (e.g., 3*3 convolution kernel or larger size), it uses depthwise (or known as channel-wise) and 1*1 pointwise convolution method to decompose convolution, such that the speed and model size are optimized, and the calculation accuracy is basically kept.

Next, a comparison between the convolution calculation process of the conventional convolutional neural network and that of the MobileNet will be described with reference to FIG. 1 to FIG. 2B.

Figure 1:
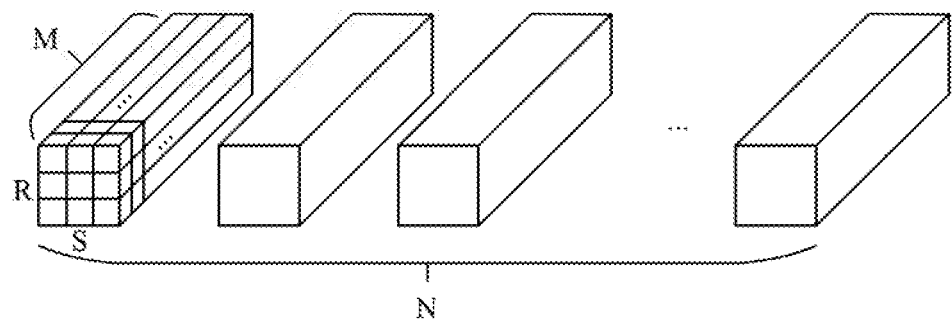
FIG. 1 shows a schematic diagram of a convolution kernel in a conventional convolutional neural network.
Figure 2A:
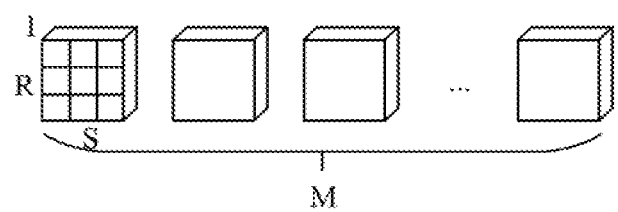
FIG. 2A shows a schematic diagram of a convolution kernel of a depthwise convolution operation in a MobileNet.
Figure 2B:
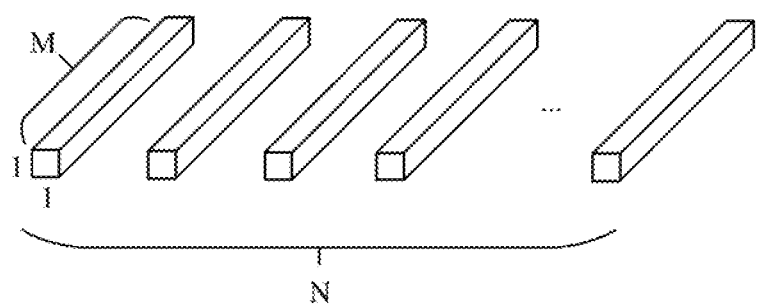
FIG. 2B shows a schematic diagram of a convolution kernel of a pointwise convolution operation in a MobileNet.

FIG. 1 shows a schematic diagram of convolution kernels in a conventional convolutional neural network, FIG. 2A shows a schematic diagram of convolution kernels of depthwise convolution operations in the MobileNet, and FIG. 2B shows a schematic diagram of convolution kernels of pointwise convolution operations in the MobileNet.

As shown in FIG. 1, assuming that the size of convolution kernels in a conventional convolutional neural network is R rows and S columns, with a total of M channels and N such convolution kernels, then the calculation amount of convolution calculation with the input feature map to output one point is R*S*M*N. Assuming that the input feature map size is X rows and Y columns, with a total of M channels, then the calculation amount of the entire convolution calculation is R*S*M*N*X*Y. Expressed by a formula, the value of a certain output point (x, y, n) is:

$$Fout_{x,y,n} = \sum_{r,s,m} K_{r,s,m,n} * Fin_{x+s-1,y+r-1,m}$$

The cascade of the depthwise convolution shown in FIG. 2A the pointwise convolution shown in FIG. 2B MobileNet convolution operation corresponding to the conventional convolution operation in FIG. 1.

The depthwise convolution in FIG. 2A may be regarded as splitting M channels of one convolution kernel in the conventional convolution into M depthwise convolution kernels, each of which has R rows and S columns, and only 1 channel. The M depthwise convolution kernels convolve with the M channels of the input feature map, respectively, to obtain output results of the M channels without accumulation. The calculation amount of the entire convolution calculation is R*S*M*1*X*Y. Expressed by a formula, the value of a certain output point (x, y, m) is:

$$Fout_{x,y,m} = \sum_{r,s} K'_{r,s,m} * Fin_{x+s-1,y+r-1,m}$$

The pointwise convolution in FIG. 2B is exactly the same as the conventional convolution operation, except that the size of the convolution kernel is 1 row and 1 column, with a total of M channels and N of such convolution kernels. The N depthwise convolution kernels respectively convolve with the input feature map to obtain output results of the N channels. The calculation amount of the entire convolution calculations is 1*1*M*N*X*Y. Expressed by a formula, the value of a certain output point (x, y, n) is:

$$Fout_{x,y,n} = \sum_{m} K''_{m,n} * Fin_{x-1,y-1,m}$$

It may be seen that the MobileNet convolution operation reduces the calculation amount of conventional convolution from R*S*M*N*X*Y to R*S*M*X*Y+M*N*X*Y, which significantly reduces the calculation amount of convolution operations. Therefore, it may be seen that in the case where R*S is 3*3, the calculation amount is one-ninth to one-eighth of the equivalent conventional convolution.

At present, all of the existing implementation solutions of MobileNet need to firstly calculate intermediate output results of the depthwise convolution operations, and store them continuously in an on-chip SRAM until all calculations are completed, and then read them from the on-chip SRAM as input data of the pointwise convolution operation, and perform calculation. Since a large number of depthwise convolution intermediate output results are to be stored in the on-chip random access memory, a large amount of on-chip memories are required, which causes an increase in chip area and cost, or if the intermediate results are stored in an off-chip random access memory, it will bring a greater burden on the limited data transmission bandwidth and increase the power consumption of the system.

For this technical problem, considering the special convolution structure of MobileNet network—depthwise convolution followed by pointwise convolution, the present disclosure provides a method for convolution calculation in a neural network, an apparatus, an electronic device, a computer program product and a computer readable storage medium, which may perform a depthwise convolution calculation and a pointwise convolution calculation according to an input feature map, depthwise kernels and pointwise kernels to obtain output feature values of a first predetermined number p of points on all of pointwise output channels, and repeat the above operation to obtain output feature values of all the points on all the pointwise output channels. Therefore, the storage space for storing the intermediate output results of the depthwise convolution may be reduced, such that a more efficient convolutional neural network may be realized.

Those skilled in the art should understand that the convolution calculation method according to embodiments of the present disclosure may be applied not only to the MobileNet convolutional neural network, but also to other types of convolutional neural networks as long as they include a convolution calculation process with a depthwise convolution followed by a pointwise convolution, therefore, the embodiments of the present disclosure are not intended to impose any limitation on the type of convolutional neural network.

After introducing the basic principles of the present disclosure, various non-limiting embodiments of the present disclosure will be specifically described below by taking MobileNet as an example and referring to the drawings.

Exemplary Method

Figure 3:
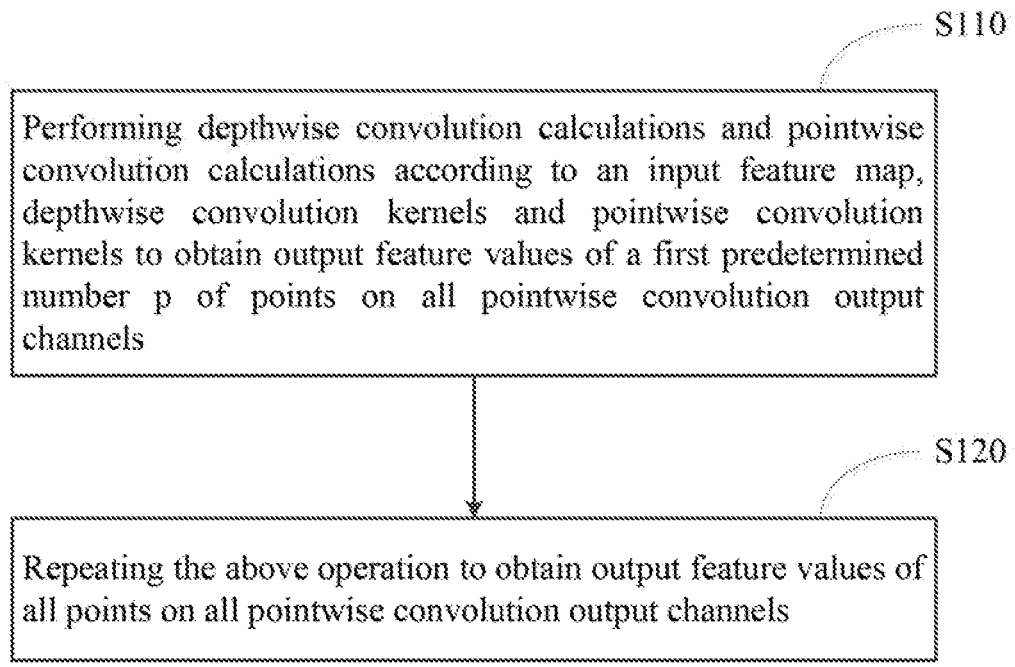
FIG. 3 shows a flowchart of a method for convolution calculation according to an embodiment of the present disclosure.

FIG. 3 shows a flowchart of a method for convolution calculation according to an embodiment of the present disclosure.

As shown in FIG. 3, the convolution calculation method according to an embodiment of the present disclosure may comprise:

in step S110, a depthwise convolution calculation and a pointwise convolution calculation are performed according to an input feature map, depthwise convolution kernels and pointwise convolution kernels, to obtain output feature values of a first predetermined number p of points on all pointwise convolution output channels.

The first predetermined number p may be determined according to at least one of available space in a memory, a number of depthwise convolution calculation units, height and width dimension, and channel number dimensions of the input feature map.

For example, the memory may be an on-chip random access memory (SRAM) to achieve faster access speed and avoid occupying data transmission bandwidth. However, the present disclosure is not limited thereto. For example, the memory may be other memories, such as an off chip memory (DDR). The available space in the memory may be used to buffer intermediate output results of depthwise convolution operations.

For example, when the width and height are larger (i.e. the points are more) and the number of channels of the current convolutional layer is smaller (i.e. the depth is very shallow) (e.g., the current layer is in the first few layers of the entire convolutional neural network), the first predetermined number p may be set to a larger value. On the contrary, when the width and height of the current convolutional layer are smaller (i.e. the points are fewer) and the number of channels is larger (i.e. the depth is very deep) (e.g., the current layer is in the latest few layers of the entire convolutional neural network), the first predetermined number p may be set to a smaller value.

Assuming that the depthwise convolution has M channels (or also referred to as M depthwise convolution kernels), the available space in the memory needs to buffer the intermediate output results of the depthwise convolution operations, i.e. the p*M intermediate feature values need to be buffered. When the feature values are unquantized data, the capacity C of the available space should be greater than or equal to p*m*32 bits, and when the feature values are 8-bit quantized data, the capacity C of the available space should be greater than or equal to p*m*8 bits. Therefore, it may be seen from another angle that in a case where the capacity of the available space is fixed, if quantization is not used, the first predetermined number p may take C/(M*32); if quantization is used, the first predetermined number p may take C/(M*8).

Furthermore, the first predetermined number p may also be limited by the number of depthwise convolution calculation units (e.g., multiplier adder unit MAC), which may be a divisor of the number of multiplier adder units.

In step S120, the above operation (i.e. step S110) is repeated to obtain output feature values of all points on all pointwise convolution output channels.

For example, step S110 is performed again, and output feature values of a next first predetermined number p of points on all pointwise convolution output channels are calculated, and step S110 is continuously repeated until the output feature values of all points on all pointwise convolution output channels are obtained.

If the number of remaining points is not enough to generate the output feature values of P points during the process of the last calculation, it may be realized by a padding (e.g., 0 is padded) manner. Alternatively, it may also be realized by other manners such as reducing working convolution calculation units.

According to the existing implementation solutions, all intermediate output results of the depthwise convolution operations are firstly calculated and stored. It is assumed that as the intermediate output results of the depthwise convolution operations, there are a total of H rows and W columns in the height and width dimensions. In an embodiment of the present disclosure, according to the feature that the depthwise convolution is followed by the pointwise convolution in Mobilenet, instead of waiting for the calculation for all of the H*W intermediate output points having been completed before calculating the pointwise convolution operations, the pointwise convolution operations are performed immediately after only the depthwise convolution results of p (p is less than H*W, preferably much less than H*W, certainly p may also be equal to H*W) points are calculated, such that the storage space required for the intermediate output results of the depthwise convolution operation is reduced to p/(H*W) of the storage space required for the conventional convolutional neural network, which significantly reduces the storage space for storing the intermediate output results of the depthwise convolution operations. Assuming that the intermediate data amount output by the depthwise convolution operations is H*W*M, then in the embodiment of the present disclosure, only the on-chip storage resource having a p*M (may be much less than H*W*M) size is needed, in order to avoid a complex process that writing the depthwise convolution results to the off-chip memory in batches due to insufficient on-chip storage space until the intermediate results output by all depthwise convolution operations have been calculated and then are read in batches for pointwise convolution calculations. According to the statistics, in a case where the on-chip storage resources are not enough to store next full-layer of convolution output results, but p/(H*W) of the next full-layer of convolution output results may be stored, the present disclosure reduces the data transmission bandwidth of the MobileNet network by about 50%.

Hereinafter, it will describe in detail in various embodiments the step S110 of performing the depthwise convolution calculations and the pointwise convolution calculations in the input feature map to obtain the output feature values of the first predetermined number p of points on all pointwise convolution output channels according to the embodiments of the present disclosure.

It should be noted that various embodiments may also be combined together in whole or in part where possible, although the various embodiments has been respectively described.

First Embodiment

In the first embodiment of the present disclosure, in order to obtain the output feature values of the first predetermined number p of points on all pointwise convolution output channels, the following operations may be performed: (1) performing depthwise convolution operations to obtain intermediate feature values of a first predetermined number p of points on all depthwise convolution output channels; (2) performing pointwise convolution operations based on the intermediate feature values to obtain output feature values of p points on one or more pointwise convolution output channels; (3) repeating the above operation (2) to obtain output feature values of p points on all pointwise convolution output channels.

Figure 4:
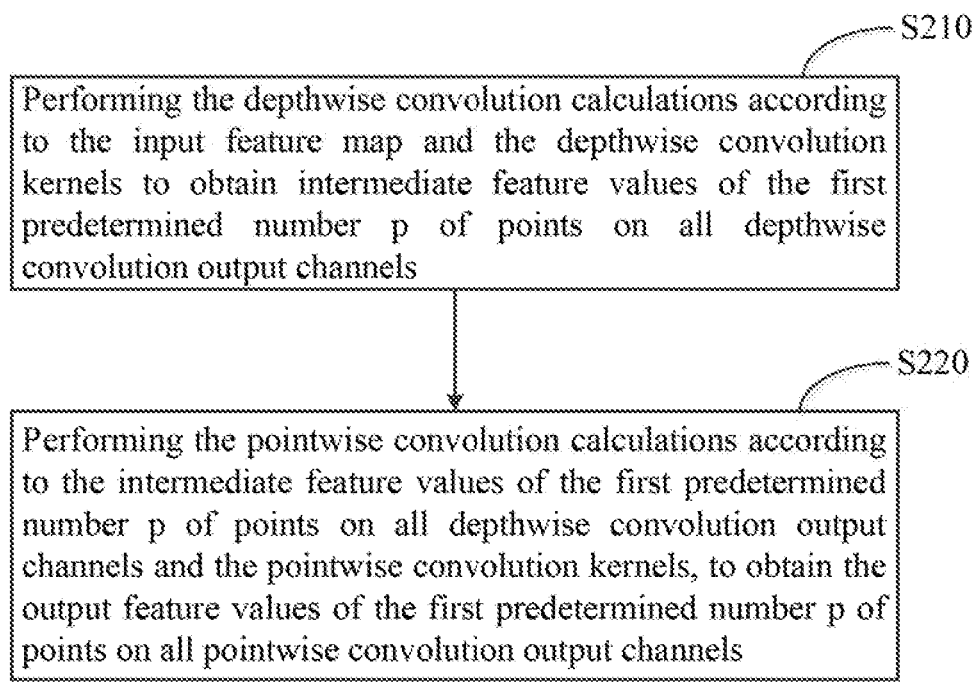
FIG. 4 shows a flowchart of the step of calculating output feature values of a first predetermined number p of points on all pointwise convolution output channels according to the first embodiment of the present disclosure.

FIG. 4 shows a flowchart of the step of calculating the output feature values of the first predetermined number p of points on all pointwise convolution output channels according to the first embodiment of the present disclosure.

As shown in FIG. 4, according to the first embodiment of the present disclosure, the step S110 of calculating the output feature values of the first predetermined number p of points on all pointwise convolution output channels may comprise:

In step S210, depthwise convolution calculations are performed according to an input feature map and a depthwise convolution kernel to obtain intermediate feature values of a first predetermined number p of points on all depthwise convolution output channels.

In the current convolutional layer, an input feature map and a depthwise convolution kernel are obtained, and depthwise convolution calculations are performed. It is assumed that the size of the input feature map is X rows and Y columns, and a total of M channels. Correspondingly, there are M depthwise convolution kernels, and the size of each depthwise convolution kernel is R rows and S columns, and only 1 channel. When performing the depthwise convolution calculation, the first channel of the input feature map is convolved with the first depthwise convolution kernel to obtain a first channel of the intermediate feature map, and the second channel of the input feature map is convolved with the second depthwise convolution kernel to obtain the second channel of the intermediate feature map, and so on, to obtain the intermediate feature map containing the intermediate feature values and having H rows and W columns and a total of M channels. H=R and W=S when a stride of the depthwise convolution calculation is 1 and the padding is 1.

In the first embodiment, unlike the prior art, instead of all the intermediate feature values of all H*W points on all M depthwise convolution output channels having been directly calculated, only the intermediate feature values of p points on all M channels are calculated.

In step S220, the pointwise convolution calculations are performed according to the intermediate feature values of the first predetermined number p of points on all depthwise convolution output channels and pointwise convolution kernels, to obtain output feature values of the first predetermined number p of points on all pointwise convolution output channels.

The pointwise convolution kernels are obtained, and the pointwise convolution calculations are performed on the intermediate feature values of p points on all M channels, to obtain the output feature values of p points on all pointwise convolution output channels.

As described above, the size of intermediate feature map is H rows and W columns, with a total of M channels. Correspondingly, there are N pointwise convolution kernels, each of which has 1 row and 1 column, with only 1 channel. When performing the pointwise convolution calculations, all channels of the intermediate feature map are convoluted with all channels of the first pointwise convolution kernel to obtain the first channel of the output feature map, and all channels of the intermediate feature map are convoluted with all channels of the second pointwise convolution kernel to obtain the second channel of the output feature map, and so on, to obtain the output feature map including output feature values and having E rows and F columns, with a total of N channels. When a stride of the pointwise convolution calculation is 1, E=H and F=W.

Firstly, the step S210 of performing the depthwise convolution calculation on the input feature map to obtain the intermediate feature values of the first, predetermined number p of points on all depthwise convolution output channels will be described with reference to FIG. 5 and FIG. 6.

Figure 5:
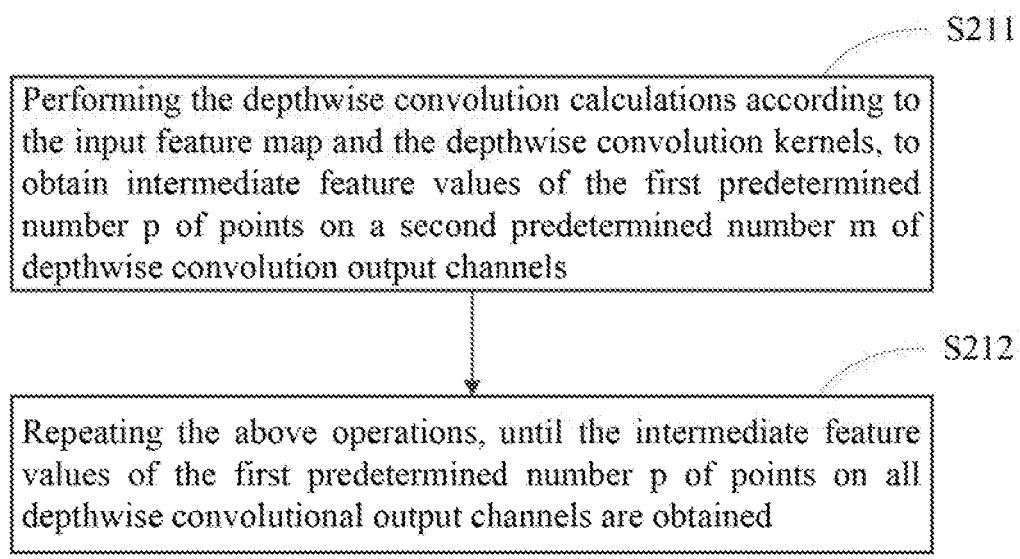
FIG. 5 shows a flowchart of the step of calculating intermediate feature values of a first predetermined number p of points on all depthwise convolution output channels according to the first embodiment of the present disclosure.

FIG. 5 shows a flowchart of the step of calculating the intermediate feature values of the first predetermined number p of points on all depthwise convolution output channels according to the first embodiment of the present disclosure. FIG. 6 shows a schematic diagram of the step of calculating the intermediate feature values of the first predetermined number p of points on all depthwise convolution output channels according to the first embodiment of the present disclosure.

As shown in FIG. 5, the step S210 of calculating the intermediate feature values of the first predetermined number p of points on all the depthwise convolution output channels may comprise:

In step S211, depthwise convolution calculations are performed according to the input feature map and the depthwise convolution kernel, to obtain intermediate feature values of the first predetermined number p of points on a second predetermined number m of depthwise convolution output channels.

For example, the second predetermined number m may be determined according to the number of depthwise convolution calculation units and the first predetermined number p. For example, based on computational efficiency considerations, it is desirable to make the depthwise convolution calculation units in the hardware circuit operate at full capacity. In this case, the second predetermined number m * the first predetermined number p=the number of MACs of the depthwise convolution calculation units.

Assuming that there are 512 multiplier adder units for depthwise convolution calculations, then, for example, the depthwise convolution calculations of 32 points (p=32), 16 channels (m=16) may be simultaneously calculated at a time. As mentioned above, different values of p and m may also be selected for other considerations. For example, when the width and height of the current convolutional layer are relatively large and the number of channels is relatively small, p may be set to a larger value, for example, 64, 128, etc., and correspondingly, m may be set to a smaller value, for example, 8, 4, etc. Conversely, when the width and height of the current convolutional layer are smaller and the number of channels is larger, p may be set to a smaller value, for example, 16, 8, etc., and correspondingly, m may be set to a larger value, for example, 32, 64, etc.

Figure 6:
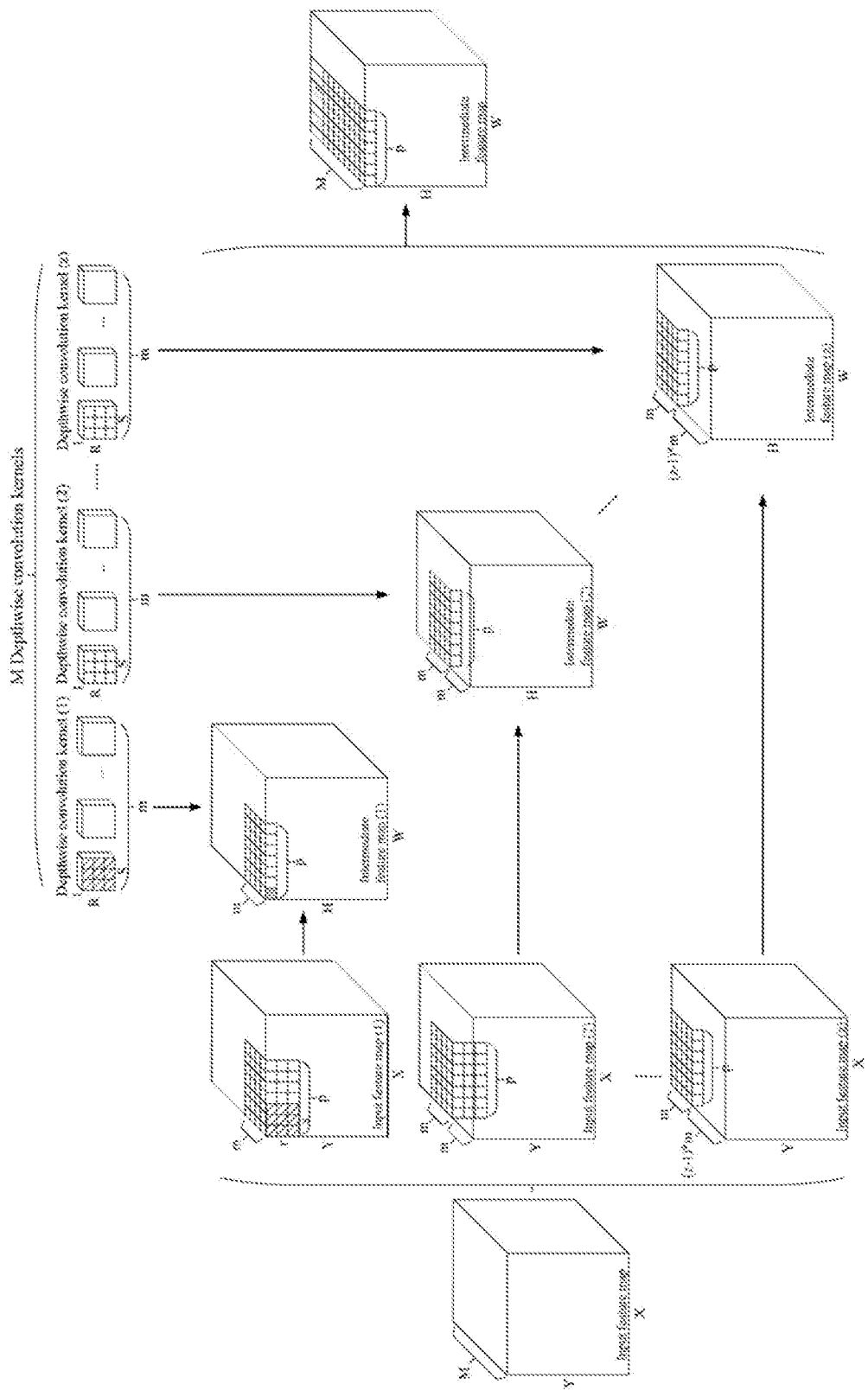
FIG. 6 shows a schematic diagram of the step of calculating intermediate feature values of a first predetermined number p of points on all depthwise convolution output channels according to the first embodiment of the present disclosure.

For example, as shown in FIG. 6, the intermediate feature map (1) may be firstly calculated based on the input feature map (1) and the depthwise convolution kernel (1). In FIG. 6, the input feature map (1) is a set of input feature points which have p points, m input channels, and the depthwise convolution kernel (1) is a set of m depthwise convolution kernels.

In an example, the step S211 may comprise:

Substep 1: reading input feature values of the first predetermined number p groups of points on the second predetermined number m of input channels of the input feature map.

For example, the input feature values of the first predetermined number p groups of points on the second predetermined number m of input channels may be read from the input feature map (as shown in the input feature map in FIG. 6), and each group of points has a width and a height (as shown in the shadow in the input feature map (1) in FIG. 6) equal to a width and a height (as shown in the shadow in the depthwise convolution kernel (1) in FIG. 6, i.e. R*S) of the weight values in the depthwise convolution kernel, and two adjacent groups of points have a reading stride equal to a stride of the depthwise convolution calculation.

Depending on the reading stride, an overlapping portion may be located between every two adjacent groups of points in the p groups of points.

For example, at the first execution, the input feature values of the former p groups of points on the former m input channels may be read from the input feature map (the input feature values shown in the input feature map (1) in FIG. 6).

Substep 2: corresponding to the input feature values of the first predetermined number p groups of points, reading corresponding weight values of the second predetermined number m of depthwise convolution kernels on the second predetermined number m of input channels. In an example, the input feature values of a first predetermined number p of groups of points on a second predetermined number m of input channels and the corresponding weight values are read from the input feature map, concurrent with the step of performing pointwise convolution calculations according to the intermediate feature values of the first predetermined number p of points on the second predetermined number in of depthwise convolution output channels and the pointwise convolution kernels. Therefore, based on this example, the computational efficiency of the convolutional neural network is improved and a more efficient convolutional neural network is achieved.

For example, at the first execution, the weight values (as the weight values in the depthwise convolution kernel (1) shown in FIG. 6) in the former in depthwise convolution kernels may be read from the depthwise convolution kernels (as M depthwise convolution kernels (1) shown in FIG. 6).

Substep 3: respectively performing the depthwise convolution calculations on the input feature values of the first predetermined number p groups of points on the second predetermined number m of input channels and on weight values in corresponding second predetermined number m of depthwise convolution kernels, to obtain intermediate feature values of the first predetermined number p of points respectively corresponding to the first predetermined number p group of points on the second predetermined number m of depthwise convolution output channels.

For example, the intermediate feature map (1) may be calculated according to the input feature map (1) and the depthwise convolution kernels (1).

For example, in substep 3, the following operations may be performed for each group of points in the first predetermined number p groups of points: (1) respectively performing multiplication calculations on input feature values of one point of the group of points on the second predetermined number m of input channels and one corresponding weight value in the corresponding second predetermined number m of depthwise convolution kernels, to obtain current multiplication calculation results of the group of points; (2) respectively performing accumulation calculations on the current multiplication calculation results of the group of points and the multiplication calculation results of the previous time of the group of points, the multiplication calculation results of the previous time being obtained by respectively performing multiplication calculations on input feature values of previous one point in the group of points on the second predetermined number m of input channels and a corresponding previous weight value in the corresponding second predetermined number m of depthwise convolution kernels; and (3) repeating above operations (1) and (2), respectively performing multiplication calculations on input feature values of a next point of the group of points on the second predetermined number m of input channels and a corresponding next weight value in the corresponding second predetermined number m of depthwise convolution kernels and correspondingly performing subsequent operations, until the multiplication calculations and accumulation calculations are completed on the input feature values of all points in the group of points on the second predetermined number m of input channels, and the final accumulation calculation results of the group of points being an intermediate feature value of one point (as shown in the shadow in intermediate feature map (1) in FIG. 6) corresponding to the group of points on the second predetermined number m of depthwise convolution output channels.

After performing multiplication calculations on the first point in the group of points, since the multiplication calculation results of the previous time of the group of points do not exist or are 0, therefore, there is no need to perform accumulation, in other words, the accumulation calculation results are the multiplication calculation results themselves.

As shown in FIG. 6, there are a total of R*S points in one group of points, i.e. substep (3), R*S multiplication calculations and corresponding accumulation calculations are performed for a group of points.

Through the above calculations, the intermediate feature values (the intermediate feature values shown in the intermediate feature map (1) in FIG. 6) of the first predetermined number p of points on the second predetermined number m of depthwise convolution output channels may be obtained.

For example, the intermediate feature values of the first predetermined number p of points on the second predetermined number m of depthwise convolution output channels may be stored in the memory after step S211. In other words, after obtaining intermediate feature values of the first predetermined number p of points on the second predetermined number m of depthwise convolution output channels, each intermediate feature value is stored in the available space of the memory.

According to the current design parameters of the convolutional layer, at least one of the following operations may be performed for each intermediate feature value after obtaining but before storing each intermediate feature value: activation operation and quantization operation.

If the activation function is not added to the neural network, it may be regarded as linear expression to a certain extent, and the final expression ability is not good, and if some nonlinear activation functions are added, a nonlinear portion is introduced in the whole network, and the expression ability of the network is increased. At present, the popular activation functions mainly include Sigmoid, Tanh, ReLu, Softmax and so on.

Further, the quantization operation and inverse quantization operation may also be introduced to the calculation data. For example, high-precision output data may be compressed into low precision output data by shifting or multiplication and division, such that the storage space occupied by each data in the memory is reduced and the access speed is fully improved.

For example, the unquantized high precision data may be 32 bits, while the quantized low precision data may be 8 bits, such that 75% storage space is saved.

For example, the optional activation operation may be performed, and then the optional quantization operation is performed.

In step S212, the above operations are repeated (i.e. step S211), and the depthwise convolution calculations are performed according to the input feature maps and the depthwise convolution kernels, to obtain the intermediate feature values of the first predetermined number p of points on a next second predetermined number m of depthwise convolution output channels, and correspondingly performing subsequent operations, until the intermediate feature values of the first predetermined number p of points on all depthwise convolutional output channels are obtained.

For example, next, as shown in FIG. 6, the intermediate feature map (2) may be calculated according to the input feature map (2) and the depthwise convolution kernel (2), and so on, the intermediate feature map (z) may be calculated according to the input feature map (z) and the depthwise convolution kernel (z). For example, z=[M/m]. If, during the last calculation, the number of remaining channels and the number of depthwise convolution kernels are not enough to read the input feature value of m channels with the weight values in the m depthwise convolution kernels, it may be realized through a padding (for example, padding 0) manner. Alternatively, it may also be realized by other manners, for example reducing working depthwise convolution calculation units.

Finally, for the combination from the intermediate feature map (1) to the intermediate feature map (z), which means the complete intermediate feature map including the intermediate feature values as the intermediate output results of the depthwise convolution operation, the size of the intermediate feature map is p points and have a total of M channels, as shown in the intermediate feature map in FIG. 6.

Figure 8:
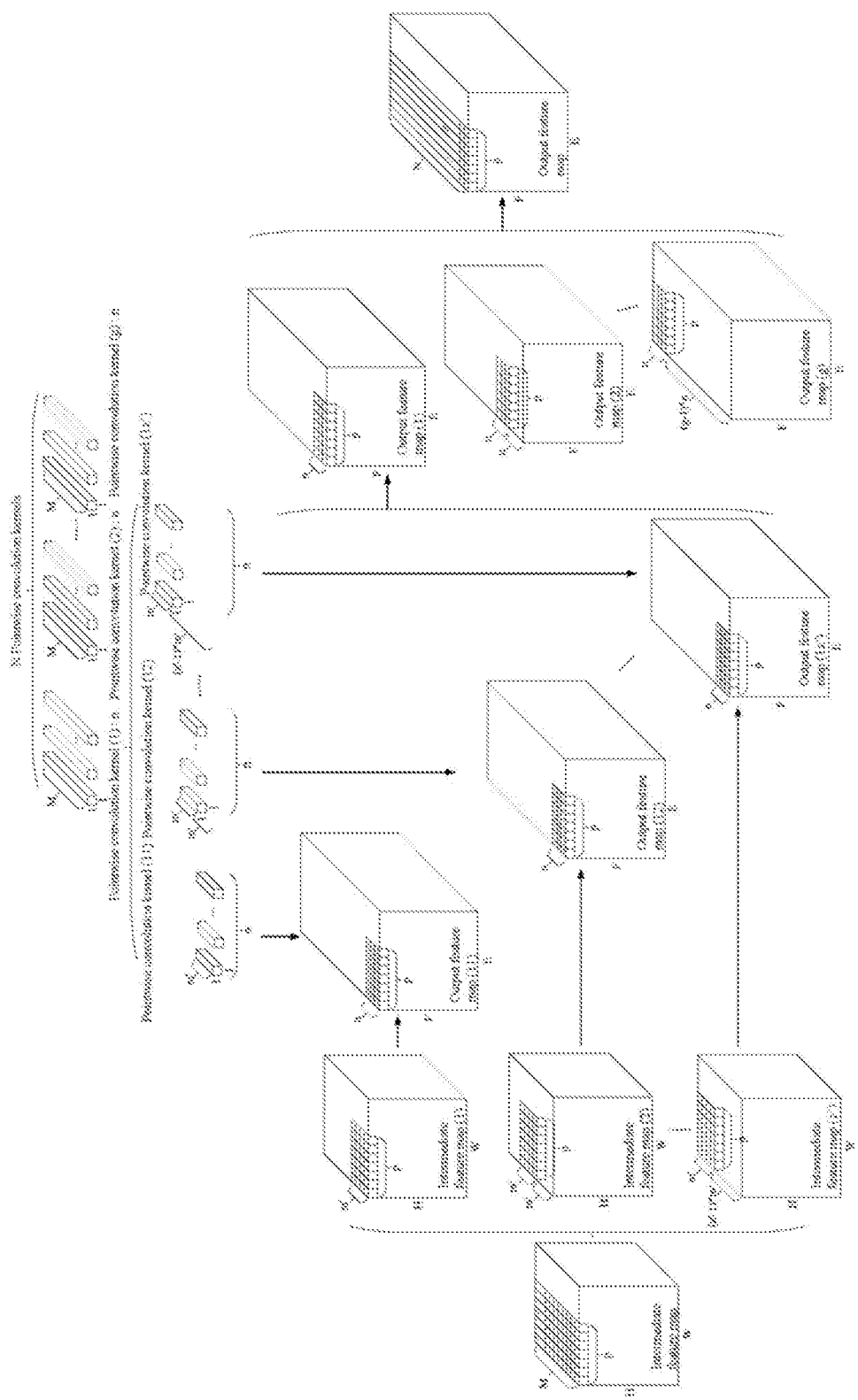
FIG. 8 shows a schematic diagram of the step of calculating output feature values of a first predetermined number p of points on all pointwise convolution output channels according to the intermediate feature values and the pointwise convolution kernels according to the first embodiment of the present disclosure.

Next, it will refer to FIGS. 7 and 8 to describe a step S220 of performing a pointwise convolution calculation on the intermediate feature map to obtain output feature values of the first predetermined number p of points on all pointwise convolution output channels.

FIG. 7 shows a flowchart of the step of calculating the output feature values of the first predetermined number p of points on all pointwise convolution output channels according to the intermediate feature values and the pointwise convolution kernels in accordance with the first embodiment of the present disclosure. FIG. 8 shows a schematic diagram of the step of calculating the output feature values of the first predetermined number p of points on all pointwise convolution output channels according to the intermediate feature values and the pointwise convolution kernels in accordance with the first embodiment of the present disclosure.

As shown in FIG. 7, the step S220 of calculating the output feature values of the first predetermined number p of points on all pointwise convolution output channels according to the intermediate feature values and the pointwise convolution kernels may comprise:

In step S221 a pointwise convolution calculation is performed according to the intermediate feature values of the first predetermined number p of points on all depthwise convolution output channels with the weight values on all pointwise convolution channels in a fourth predetermined number n of pointwise convolution kernels, respectively, to obtain the output feature values of the first predetermined number p of points on the fourth predetermined number n of pointwise convolution output channels corresponding to the fourth predetermined number n of pointwise convolution kernels.

For example, the fourth predetermined number n is less than or equal to the total number N of pointwise convolution kernels. Furthermore, the fourth predetermined number n may also be limited by the number of pointwise convolution calculation units (e.g., multiplier adder unit MAC), which may be a divisor of the number of multiplier adder units.

For example, as shown in FIG. 8, the output feature map (1) may be firstly calculated based on the intermediate feature map and the pointwise convolution kernel (1). In FIG. 8, the pointwise convolution kernel (1) is a set of n pointwise convolution kennels.

In an example, the step S221 may comprise:

In an example, the step S221 may comprise:

Substep 1: reading intermediate feature values (as intermediate feature values shown in the intermediate feature map (1) in FIG. 8) of the first predetermined number p of points on a third predetermined number of depthwise convolution output channels from intermediate feature values of the first predetermined number p of points on all depthwise convolution output channels (as shown in the intermediate feature map (1) in FIG. 8).

For example, the third predetermined number m' and the fourth preset number n may be determined according to the number of pointwise convolution calculation units and the first predetermined number p. For example, based on computational efficiency considerations, it is desirable to make the pointwise convolution calculation units in the hardware circuit operate at full capacity. In this case, the third predetermined number m' * the fourth predetermined number n * the first predetermined number p *=the number of pointwise convolution calculation unit MAC'.

For example, for different hardware designs, the number of pointwise convolution calculation units MAC' may or may not be equal to the number of depthwise convolution calculation unit MAC. Further, the third predetermined number m' may be less than or equal to the second predetermined number m.

Assuming that there are 512 multiplier adder units for pointwise convolution calculation too, for example, the pointwise convolution calculation of 32 points (p=32), 4 channels (m'=4), and 4 convolution kernels (n=4) may be simultaneously calculated at a time. As mentioned above, different values of m and n may also be selected for other considerations. For example, when the number of current convolution kernels is relatively large and the number of channels is relatively small, in a case where p=32 remains unchanged, n may be set to a larger value, for example, 8, 16, etc., correspondingly, m' may be set to a smaller value, for example, 2, 1, etc. Conversely, when the number of current convolution kernels is relatively small and the number of channels is relatively large, in a case where p=32 remains unchanged, n may be set to a smaller value, for example, 2, 1, etc., correspondingly, m' may be set to a smaller value, for example, 8, 16, etc.

For example, at the first execution, the intermediate feature values of p points on the former m' channels may be read from the intermediate feature map obtained by the depthwise convolution calculation, as shown in the intermediate feature map (1) in FIG. 8.

It should be noted that, in the reading operation in the substep, the intermediate feature values of fifth predetermined number p' points on the third predetermined number m' of depthwise convolution output channels may also be read. For example, the fifth predetermined number p' is less than or equal to the first predetermined number p.

Substep 2: reading the weight values on the corresponding third predetermined number m' of pointwise convolution channels in the fourth predetermined number n of pointwise convolution kernels correspondingly to the intermediate feature values of the first predetermined number p of points on the third predetermined number m' of depthwise convolution output channels.

For example, at the first execution, the weight values on the former m' pointwise convolution channels (such as the weight values shown by the pointwise convolution kernel (11) in the pointwise convolution kernel (1) in FIG. 8) may be read from former n pointwise convolution kernels in N pointwise convolution kernels (as shown in the pointwise convolution kernel (1) in FIG. 8).

Substep 3: performing pointwise convolution calculation on the intermediate feature values of the first predetermined number p of points on the third predetermined number m' of depthwise convolution output channels with the weight values on the corresponding third predetermined number m' of pointwise convolution channels in the fourth predetermined number n of pointwise convolution kernels, to obtain the current pointwise convolution partial sums of the first predetermined number p of points on the fourth predetermined number n of pointwise convolution output channels corresponding to the fourth predetermined number n of pointwise convolution kernels.

For example, the current pointwise convolution partial sums (1) may be calculated according to the intermediate feature map (1) and the pointwise convolution kernel (11) (as shown in the output feature map (11) in FIG. 8).

For example, in substep 3, following operations are performed for each point in the first predetermined number p of points: (1) respectively performing multiplication calculations on the intermediate feature values of the first predetermined number p of points on the third predetermined number m' of depthwise convolution output channels with the weight values on the corresponding third predetermined number m' of pointwise convolution channels in the fourth predetermined number n of pointwise convolution kernels, to obtain results of a fourth predetermined number n of groups, results of each group including a third predetermined number m' of multiplication calculation results; and (2) respectively adding the third predetermined number m' of multiplication calculation results for results of each group in results of the fourth predetermined number n of groups, to obtain the current pointwise convolution partial sums of this point on the fourth predetermined number n pointwise convolution output channels corresponding to the fourth predetermined number n of pointwise convolution kernels.

As shown in FIG. 8, for each of p points in the intermediate feature map (1), multiplication calculations are respectively performed on the m' intermediate feature values of each point and the m' weight values in a first convolution kernel of the pointwise convolution kernels (11), and the m' multiplication calculation results are accumulated, to obtain the current pointwise convolution partial sums of p points in the first output feature map (11) on the first channel. The above operations are performed in each convolution kernel of the pointwise convolution kernels (11) to obtain the current pointwise convolution partial sums of p points in the first output feature map (11) on the former n channel.

Substep 4: respectively performing accumulation calculations on the current pointwise convolution partial sums of the first predetermined number p of points on the fourth predetermined number n of pointwise convolution output channels corresponding to the fourth predetermined number n of pointwise convolution kernels and the previous accumulation calculation results of the first predetermined number p of points, to generate current accumulation calculation results of the first predetermined number p of points.

After obtaining the current pointwise convolution partial sums of p points in the first output feature map (11) on the former n channel, since the previous accumulation calculation results of p points do not exist or are 0, therefore, there is no need to perform accumulation, or say, the accumulation calculation results are the multiplication calculation results themselves.

For example, after substep 4, the current accumulation calculation results of the first predetermined number p of points may be stored in the memory to cover the previous accumulation calculation results of the first predetermined number p of points.

Substep 5: repeating above operations (i.e. substeps 1-4), reading the intermediate feature values of the first predetermined number p of points on a next third predetermined number m' of depthwise convolution output channels, reading weight values on a corresponding next third predetermined number m' of pointwise convolution channels in a fourth predetermined number n of pointwise convolution kernels, and correspondingly performing subsequent operations until the pointwise convolution calculations and accumulation calculations are completed on the intermediate feature values of the first predetermined number p of points on all depthwise convolution output channels, the final accumulation calculation results of the first predetermined number p of points being the output feature values of the first predetermined number p of points on the fourth predetermined number n of pointwise convolution output channels corresponding to the fourth predetermined number n of pointwise convolution kernels.

For example, next, as shown in FIG. 8, the output feature map (12) may be calculated according to the intermediate feature map (2) and the pointwise convolution kernel (12), and an accumulation calculation may be performed on the output feature map (12) and the output feature map (11), and so on, the output feature map (1z') is calculated according to the intermediate feature map (z') and the pointwise convolution kernel (1z'), and the accumulation calculation is performed on the output feature map (1z') and the output feature map (1(z'−1)). For example, z'=[M/m']. If, during the last calculation, the number of remaining channels is not enough to read the intermediate feature values of m' channels and pointwise convolution weight values of m' channels, it may be realized through padding (for example, padding 0) manner. Alternatively, it may also be realized by other manners, for example reducing working pointwise convolution calculation units.

Finally, the accumulation results of the output feature map (1z') and the output feature map (1(z'−1)) are made as the output feature values of p points on n pointwise convolution output channels, as shown in the output feature map (1) in FIG. 8, the size of output feature map (1) is p points, with a total of N channels.

For example, at least one of an activation operation and a quantization operation may be performed on each output feature value before the final accumulation calculation results of the first predetermined number p of points are stored in the memory as output feature values of the first predetermined number p of points on the fourth predetermined number n of pointwise convolution output channels corresponding to the fourth predetermined number n of pointwise convolution kernels.

In step S222, the above operations are repeated (i.e. step S211), the pointwise convolution calculations are performed according to the intermediate feature values of the first predetermined number p of points on all depthwise convolution output channels with the weight values on all pointwise convolution channels in a next fourth predetermined number n of pointwise convolution kernels, respectively, until the output feature values of the first predetermined number p of points on all pointwise convolution output channels are obtained.

For example, next, as shown in FIG. 8, the output feature map (2) may be calculated according to the intermediate feature map and the pointwise convolution kernel (2), and so on, the output feature map (g) may be calculated according to the intermediate feature map and the pointwise convolution kernel (g). For example, g=[N/n]. If, during the last calculation, the number of remaining pointwise convolution kernels is not enough to read the weight values in the n pointwise convolution kernels, it may also be realized through padding (for example, padding 0) manner. Alternatively, it may also be realized by other manners, for example, reducing working pointwise convolution calculation units.

Finally, for the combination from the output feature map (1) to the output feature map (g), which means the complete output feature map including the output feature values as the final output result of the pointwise convolution operation, as shown in the output feature diagram in FIG. 8, the size of the output feature map is p points and have a total of N channels.

As described above, the output feature map may perform the optional activation operation and the optional quantization operation.

Hereinafter, a method for convolution calculation according to the first embodiment of the present disclosure will be explained in a specific example.

For example, as shown in FIG. 6 and FIG. 8, assuming that the width and height dimensions of the depthwise convolution are S*R, the number of channels (or may also be seen as number when the channel number is considered to be 1) is M; the width and height dimensions of the depthwise convolution are 1*1, the number of channels is M, and the number is N; the width and height dimensions of the input feature map are X*Y, the width and height dimensions of the intermediate feature map are W*H, and the width and height dimensions of the output feature map are E*F, the convolution calculation method may comprise the following steps:

1. For depthwise convolution, firstly calculating multiplication and accumulation results of p(p<=H*W) points and m(m<=M) channels, the accumulation here being the accumulation performed in the direction of the length and width of the convolution kernel, as R and S shown in FIG. 6, and here p*m multiply-accumulate (MAC) units being shared, and p*m multiply-accumulate results being obtained.

Figure 9:
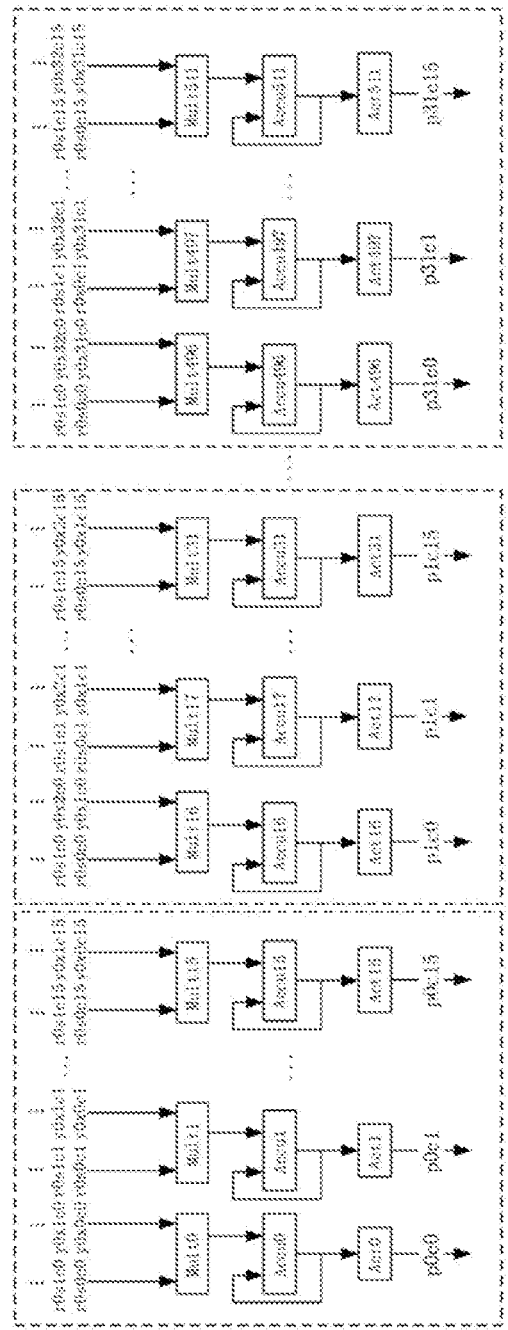
FIG. 9 shows a schematic diagram of depthwise convolution calculations according to an embodiment of the present disclosure.

FIG. 9 shows a schematic diagram of a depthwise convolution calculation according to an embodiment of the present disclosure.

As shown in FIG. 9, it is assumed that there are 512 multiplier adder units (MAC), and 32 points (the abovementioned p=32), 16 channels (the abovementioned m=16, i.e. the channel variable c takes a value from the range of 0 to 15) are simultaneously calculated at a time. Assuming that the size of the convolution kernel is 3*3, then, after 9 times of multiplication and accumulation calculations (Mult and Accu) (the height and width variables r and s of the depthwise convolution kernel changes from 0 to 2, respectively, the width variable x of the input feature map changes from 0-31 to 2-33, and the height variable y changes from 0 to 2), the output values of 32 points, 16 channels will be obtained. Assuming that there are a total of 128 channels, after (128/16)*9=72 times of calculations, the output data of 32 points, 128 channels will be obtained.

2. Performing an optional activation operation on the abovementioned results of step 1, the activation operation referring to remapping the numerical with a nonlinear function, the activation functions including but not limited to ReLu function, Sigmoid function, arctangent (tan) function, etc.

3. Performing an optional quantization operation on results obtained by the abovementioned step 2, the quantization operation referring to obtain the low-precision multiplication and accumulation results (usually 8 bit) by shifting or multiplying and dividing the high-precision multiplication and accumulation results (usually 32 bit).

4. Storing the abovementioned results of step 3 in the register or the on-chip SRAM.

5. Through [M/m] times of circulation, obtaining p*M values after calculating the depthwise convolution results of p points on the M channels, the p*M values being or being not carried out the activation function operation and the quantization operation. Since the number of points of a layer of complete output results is much greater than p, assuming that there is a total of H*W points, the storage space used here being only p/(H*W) for calculating a complete layer of depthwise operation results.

6. Directly performing pointwise calculation on the abovementioned results of step 5. The specific process is as follows:

a). Reading the results of depthwise convolution calculation of p points, m channels from the register or the on-chip SRAM, and calculating the multiplication and accumulation results of p points, m channels, the accumulation here being the accumulation in the channel direction, to obtain the pointwise convolution partial sums of p points, 1 output channel (the partial sums of the first to m-th input channels).

b). Obtaining the final multiplication and accumulation results of p points after calculation on the pointwise convolution results of p points through [M/m] times of circulation.

c). Performing an optional activation operation on the above results, the activation operation referring to remapping the numerical with a nonlinear function, and the activation functions including but not limited to ReLu function, Sigmoid function, arctangent (tan) function, etc.

d). Performing an optional quantization operation on the above results, the quantization operation referring to obtaining the low-precision multiplication and accumulation results (usually 8 bit) by shifting or multiplying and dividing the high-precision multiplication and accumulation results (usually 32 bit), and storing the results in the register or the on-chip SRAM or the off-chip DDR.

e). Completing output of the calculation results of p points on N channels through N circulation of the above operations a), b), c), d), assuming that there is a total of N convolution kernels for pointwise convolution.

Figure 10:
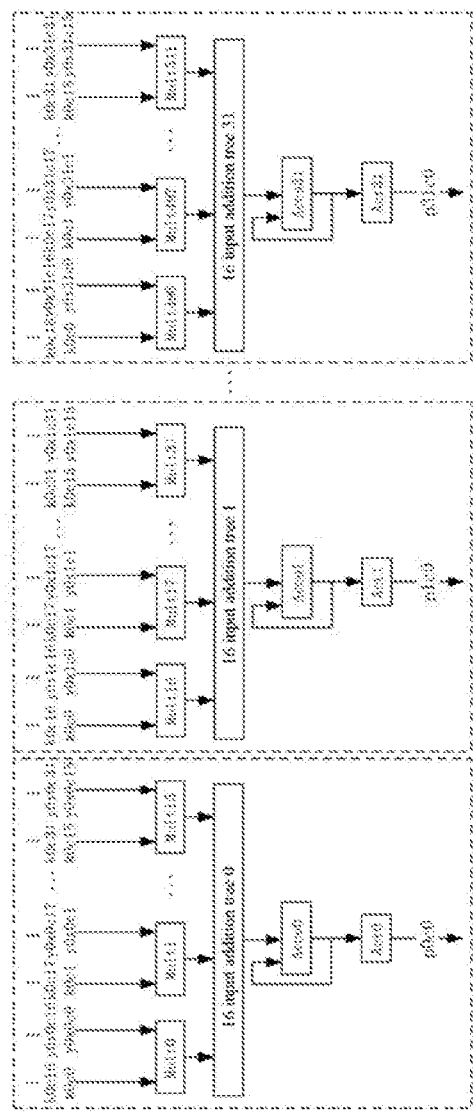
FIG. 10 shows a schematic diagram of pointwise convolution calculations according to an embodiment of the present disclosure.

FIG. 10 shows a schematic diagram of a pointwise convolution calculation according to an embodiment of the present disclosure.

As shown in FIG. 10, the size of a convolution kernel of the Pointwise convolution is 1*1, and it is also assumed that there are 512 multiplier adder units (the 512 multiplier adder units here and the 512 multiplier adder units of the Depthwise calculation process may be the same, or may be different), and a convolution for 32 points (the abovementioned p=32), 16 channels (the abovementioned m=16, i.e. the channel variable c takes a value from the range of 0 to 15), and 1 convolution kernel are calculated each time, and part of data of the accumulation sums for 32 points, 1 output channel are obtained. Assuming that there is a total of 128 channels, after 128/16=8 times of calculations (the channel variable c changes from 0-15 to 112-127), the data of the accumulation sums of 32 points and 1 output channel are obtained. And assuming that there are 256 convolution kernels, then after 256*(128/16)=2048 times of calculations, the data of the accumulation sums of 32 points and 256 output channels are obtained. That is, an output feature value of 32 points is obtained.

7. Repeating the above operations of steps 1-6 by continuously calculating next p points until the complete output feature map is obtained.

Second Embodiment

In the second embodiment of the present disclosure, in order to obtain the output feature values of the first predetermined number p of points on all pointwise convolution output channels, the following operations may be performed: 1) performing depthwise convolution operations to obtain the intermediate feature values of the first predetermined number p of points on all depthwise convolution output channels; (2) performing pointwise convolution operations according to the intermediate feature values to obtain a current pointwise convolution partial sums for p points on all of the pointwise convolution output channels; (3) performing accumulation on the current pointwise convolution partial sums and the previous accumulation calculation results, to generate the current accumulation calculation results; (4) repeating above operations (2) and (3) to obtain the output feature values of p points on all pointwise convolution output channels.

That is, the performing depthwise convolution operation in the second embodiment (step S210) is the same as the performing depthwise convolution operation in the first embodiment, and the performing pointwise convolution operation (step S220) in the second embodiment is different from the performing pointwise convolution operation in the first embodiment. Therefore, next, the differences between the two embodiments will be emphatically described.

Figure 12:
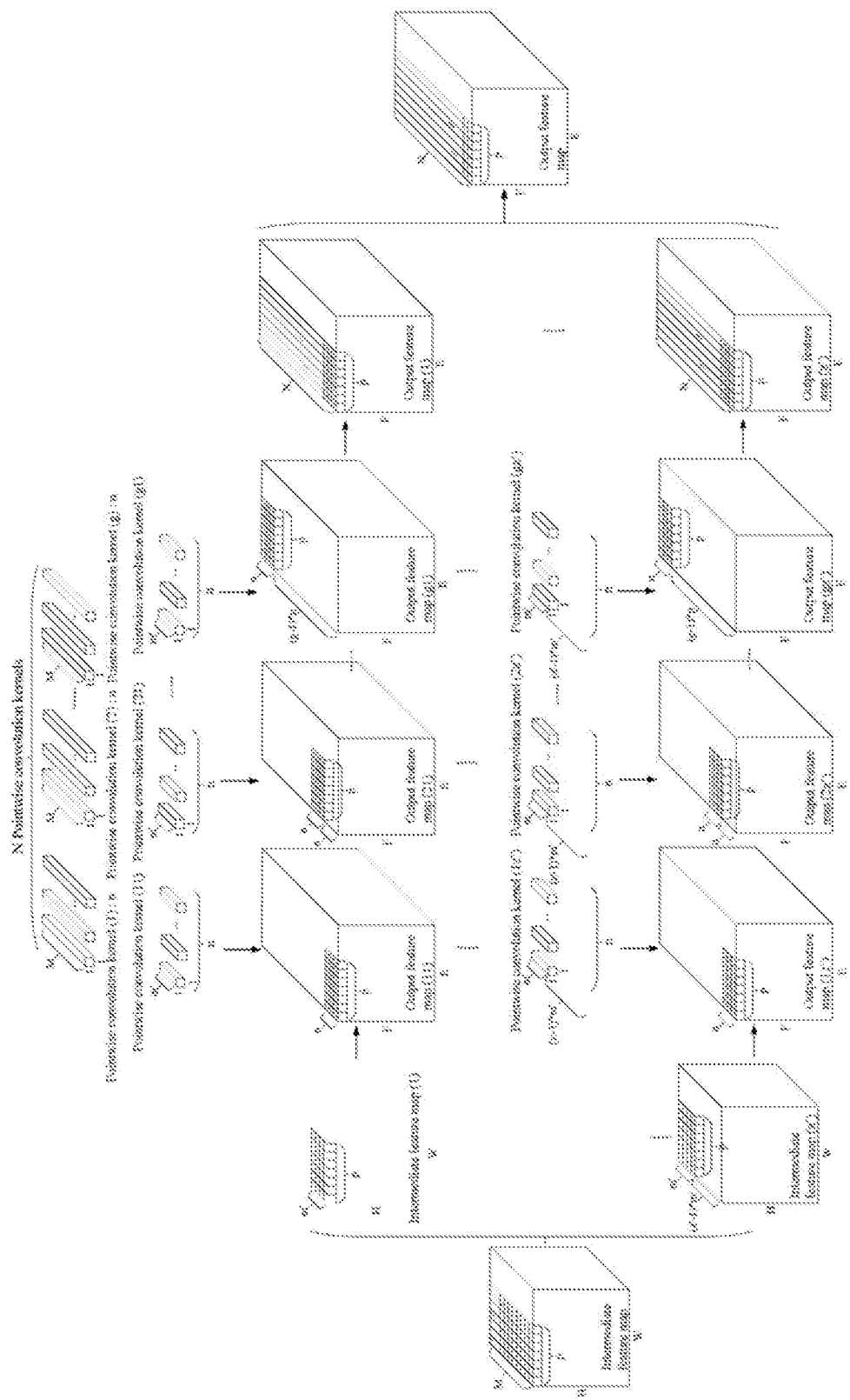
FIG. 12 shows a flowchart of the step of calculating output feature values of a first predetermined number p of points on all pointwise convolution output channels according to the intermediate feature values and the pointwise convolution kernels according to the second embodiment of the present disclosure.

FIG. 11 shows a flowchart of the step of calculating the output feature values of the first predetermined number p of points on all pointwise convolution output channels according to the intermediate feature values and the pointwise convolution kernels according to the second embodiment of the present disclosure. FIG. 12 shows a schematic diagram of the step of calculating the output feature values of the first predetermined number p of points on all pointwise convolution output channels according to the intermediate feature values and the pointwise convolution kernels according to the second embodiment of the present disclosure.

As shown in FIG. 11, the step S220 of calculating the output feature values of the first predetermined number p of points on all pointwise convolution output channels according to the intermediate feature values and the pointwise convolution kernels may comprise:

In step S223, performing the pointwise convolution calculations according to intermediate feature values of the first predetermined number p of points on the third predetermined number m' of depthwise convolution output channels and weight values on the corresponding third predetermined number m' of pointwise convolution channels in all pointwise convolution kernels, respectively, to obtain the current pointwise convolution partial sums of the first predetermined number p of points on all pointwise convolution output channels.

For example, the third predetermined number m' is less than or equal to the second predetermined number m. Furthermore, the third predetermined number m' may also be limited by the number of pointwise convolution calculation units (e.g., multiplier adder unit MAC), which may be a divisor of the number of the multiplier adder units.

In an example, the step S223 may comprise:

Substep 1: performing the pointwise convolution calculations according to the intermediate feature values of the first predetermined number p of points on the third predetermined number m' of depthwise convolution output channels with the weight values on the corresponding third predetermined number m' of pointwise convolution channels in the fourth predetermined number n of pointwise convolution kernels, to obtain the current pointwise convolution partial sums of the first predetermined number p of points an the fourth predetermined number n of pointwise convolution output channels corresponding to the fourth predetermined number n of pointwise convolution kernels.

For example, in substep 1, the following steps may be performed:

(1) Reading the intermediate feature values of the first predetermined number p of points on the third predetermined number m' of depthwise convolution output channels from the intermediate feature values of the first predetermined number p of points on all depthwise convolution output channels.

For example, at the first execution, the intermediate feature values of p points on the former m' channels may be read from the intermediate feature map obtained by the depthwise convolution calculations, as shown in the intermediate feature map (1) in FIG. 12.

(2) Reading the weight values on the corresponding third predetermined number m' of pointwise convolution channels in the fourth predetermined number n of pointwise convolution kernels correspondingly to the input feature values of the first predetermined number p of points on the third predetermined number m' of depthwise convolution output channels.

For example, at the first execution, the weight values on the former m' pointwise convolution channels (such as the weight values shown by the pointwise convolution kernel (11) of the pointwise convolution kernel (1) in FIG. 12) may be read from the former n pointwise convolution kernels in N pointwise convolution kernels (as shown in the pointwise convolution kernel (1) in FIG. 12).

(3) Performing the pointwise convolution calculations on intermediate feature values of the first predetermined number p of points on the third predetermined number m' of depthwise convolution output channels and weight values on a corresponding third predetermined number m' of pointwise convolution channels in the fourth predetermined number n of pointwise convolution kernels, to obtain the current pointwise convolution partial sums of the first predetermined number p of points on the fourth predetermined number n of pointwise convolution output channels corresponding to the fourth predetermined number n of pointwise convolution kernels.

For example, the current pointwise convolution partial sums (11) may be calculated based on the intermediate feature map (1) and the pointwise convolution kernel (11) (as shown in the output feature map (11) in FIG. 12).

This step is the same as substep 3 of step S221 in the first embodiment, therefore, a detailed description thereof will be omitted.

Substep 2: repeating the above operations by performing the pointwise convolution calculations on the intermediate feature values of the first predetermined number p of points on the third predetermined number m' of depthwise convolution output channels and weight values on the corresponding third predetermined number m' of pointwise convolution channels in a next fourth predetermined number n of pointwise convolution kernels, to obtain a current pointwise convolution partial sums of the first predetermined number p of points on the next fourth predetermined number n of pointwise convolution output channels corresponding to the next fourth predetermined number n of pointwise convolution kernels, until the current pointwise convolution partial sums of the first predetermined number p of points on all pointwise convolutional output channels are obtained.

For example, next, as shown in FIG. 12, the current pointwise convolution partial sums (21) may be calculated according to the intermediate feature map (1) and the pointwise convolution kernel (21) (as shown in the output feature map (21) in FIG. 12), and so on, the current pointwise convolution partial sums (g1) are calculated according to the intermediate feature map (1) and the pointwise convolution kernel (g1) (as shown in the output feature map (g1) in FIG. 12).

Finally, the current pointwise convolution partial sums (11) to the current pointwise convolution partial sums (g1) are combined, which means the current pointwise convolution partial sums of p points on all of the pointwise convolution output channels (1) of p points on all pointwise convolution output channels, the size of which are p points and have a total of N channels.

In step S224, accumulation calculations are respectively performed on the current pointwise convolution partial sums of the first predetermined number p of points on all pointwise convolution output channels and previous accumulation calculation results of the FIRST predetermined number p of points, to generate current accumulation calculation results of the first predetermined number p of points.

After obtaining the current pointwise convolution partial sums (1) of p points on all of the pointwise convolution output channels, since the previous accumulation calculation results do not exist or are 0, therefore, there is no need to perform accumulation, or say, the current pointwise convolution partial sums (1) are the current accumulation calculation results.

After the step S224, the current accumulation calculation results are stored in the memory to cover the previous accumulation calculation results of the first predetermined number p of points.

In step S225, the above operations (i.e. step S223 and step S224) are repeated, point vise convolution calculations are performed according to intermediate feature values of the first predetermined number p of points on the next third predetermined number m' of depthwise convolution output channels and weight values on the corresponding next third predetermined number m' of pointwise convolution channels in all pointwise convolution kernels, respectively, and subsequent operations are correspondingly performed, until the pointwise convolution calculations and accumulation calculations are completed on all of the intermediate feature values of the first predetermined number p of points on all depthwise convolution output channels, the final accumulation calculation results of the first predetermined number p of points being the output feature values of the first predetermined number p of points on all pointwise convolution output channels.

For example, next, as shown in FIG. 12, the current pointwise convolution partial sums (12) may be calculated according to the intermediate feature map (2) and the pointwise convolution kernel (12), and the current pointwise convolution partial sums (22) may be calculated according to the intermediate feature map (2) and the pointwise convolution kernel (22), and so on, the current pointwise convolution partial sums (g2) are calculated according to the intermediate feature map (2) and the pointwise convolution kernel (g2).

The current pointwise convolution partial sums (12) to the current pointwise convolution partial sums (g2) are combined together to obtain the current pointwise convolution partial sums (2) of p points on all of the pointwise convolution output channels, the size of which are p points have a total of N channels.

After obtaining the current pointwise convolution partial, sums (2) of p points on all of the pointwise convolution output channels, the current pointwise convolution partial sums (2) are accumulated with the previous accumulation calculation results (i.e. the current pointwise convolution partial sums (1)).

And so on, the current pointwise convolution partial sums (1z') to the current pointwise convolution partial sums (gz') are combined together to obtain the current pointwise convolution partial sums (z') of p points on all of the pointwise convolution output channels, the size of which are p points and have a total of N channels.

After obtaining the current pointwise convolution partial sums (z') of p points on all of the pointwise convolution output channels, the current pointwise convolution partial sums (z') are accumulated with the previous accumulation calculation results (i.e. the current pointwise convolution partial sums (1) to the current pointwise convolution partial sums (z'−1)), such that an output feature map including the output feature values as the final output results of the pointwise convolution operation is obtained, as shown in the output feature diagram in FIG. 8, the size of which are p points and have a total of N channels.

For example, at least one of an activation operation and a quantization operation may be performed on each output feature value before the final accumulation calculation results of the first predetermined number p of points is stored in the memory as the output feature values of the first predetermined number p of points on all pointwise convolution output channels.

Third Embodiment

In the third embodiment of the present disclosure, in order to obtain output feature values of a first predetermined number p of points on all pointwise convolution output channels, the following operations may be performed: (1) performing depthwise convolution operations to obtain the intermediate feature values of the first predetermined number p of points on a second predetermined number m of depthwise convolution output channels; (2) performing pointwise convolution operations according to the intermediate feature values to obtain the current pointwise convolution partial sums of p points on all of the pointwise convolution output channels; (3) performing accumulation on the current pointwise convolution partial sums and the previous accumulation calculation results, to generate the current accumulation calculation results; (4) repeating the above operations (1) and (3) to obtain the output feature values of p points on all pointwise convolution output channels.

Figure 13:
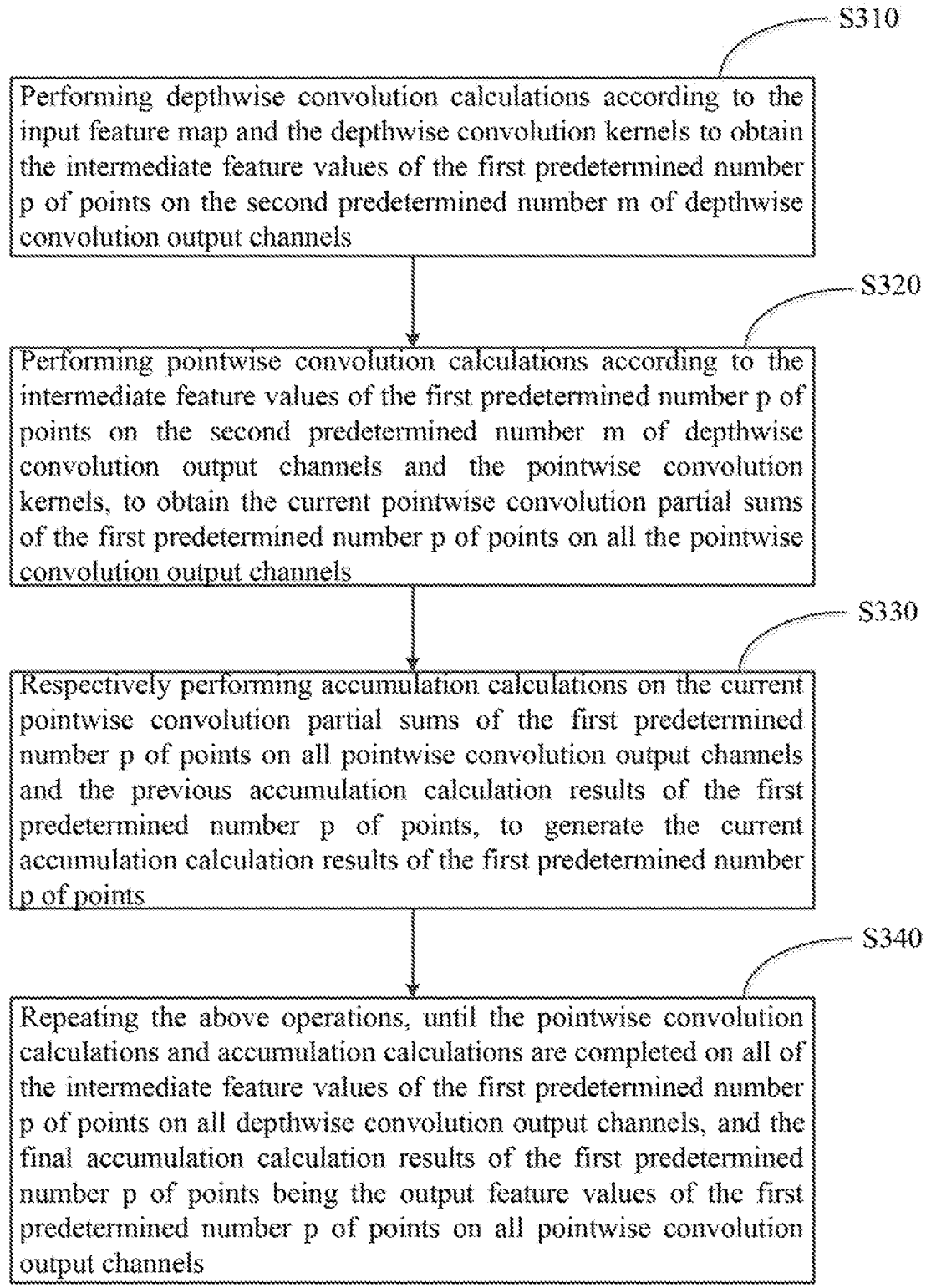
FIG. 13 shows a flowchart of the step of calculating output feature values of a first predetermined number p of points on all pointwise convolution output channels according to the third embodiment of the present disclosure.
Figure 14:
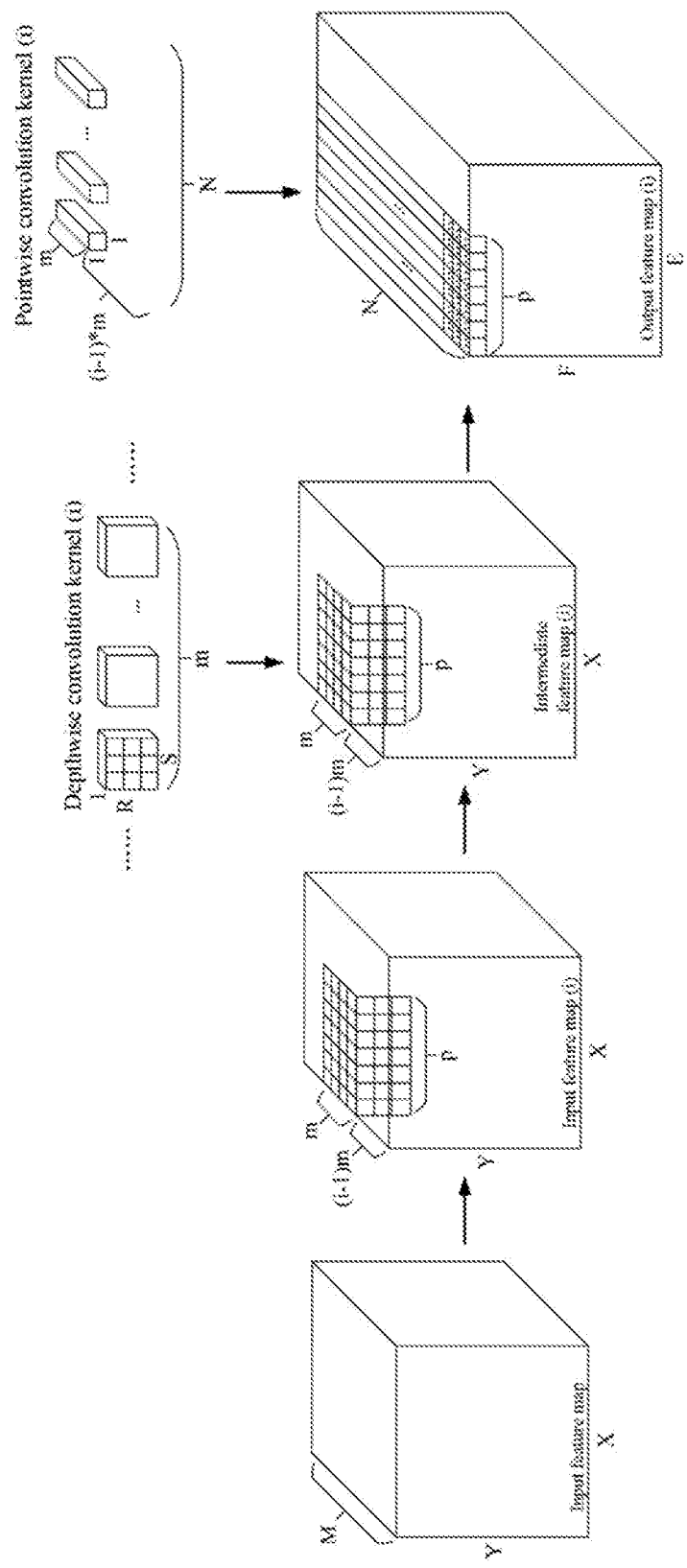
FIG. 14 shows a schematic diagram of the step of calculating a current pointwise convolution partial sums of a first predetermined number p of points on all pointwise convolution output channels according to the third embodiment of the present disclosure.

FIG. 13 shows a flowchart of the step of calculating the output feature values of the first predetermined number p of points on all pointwise convolution output channels according to the third embodiment of the present disclosure. FIG. 14 shows a schematic diagram of the step of calculating the current pointwise convolution partial sums ($i, 1 \leq i \leq z, z=[M/m]$) of the first predetermined number p of points on all pointwise convolution output channels according to the third embodiment of the present disclosure.

As shown in. FIG. 13, according to the third embodiment of the present disclosure, the step S110 of calculating the output feature values of the first predetermined number p of points on all pointwise convolution output channels may comprise:

In step S310, depthwise convolution calculations are performer according to the input feature map and the depthwise convolution kernels to obtain the intermediate feature values of the first predetermined number p of points on the second predetermined number m of depthwise convolution output channels.

For example, the second predetermined number m is determined according to the number of depthwise convolution calculation units and the first predetermined number p.

In an example, the step S310 may comprise:

Substep 1: reading input feature values of the first predetermined number p groups of points on the second predetermined number m of input channels from the input feature map.

Substep 2: reading weight values in the corresponding second predetermined number m of depthwise convolution kernels correspondingly to the input feature values of the first predetermined number p groups of points on the second predetermined number m of input channels.

Substep 3: respectively performing the depthwise convolution calculations on the input feature values of the first predetermined number p groups of points on the second predetermined number m of input channels with the weight values in the corresponding second predetermined number m of depthwise convolution kernels, to obtain intermediate feature values of the first predetermined number p of points respectively corresponding to the first predetermined number p groups of points on the second predetermined number m of depthwise convolution output channels.

The substeps 1-3 in this step S310 are the same as the substeps 1-3 of the step S211 in the first embodiment, therefore, a detailed description thereof will be omitted.

For example, at the first execution, firstly, the input feature values of the former p group of points on the former m input channels may be read from the input feature map (as the input feature values shown in the input feature map (i=1) in FIG. 14). Then, the weight values (as the weight values shown in the depthwise convolution kernel (1) in FIG. 6) in the former m depthwise convolution kernels may be read from the depthwise convolution kernels (as shown by the M depthwise convolution kernels in FIG. 6). Finally, the intermediate feature map (i=1) may be calculated according to the input feature map (1) and the depthwise convolution kernel (1).

For example, the intermediate feature values of the first predetermined number p of points on the second predetermined number m of depthwise convolution output channels may be stored in the memory after substep 3. In other words, after obtaining the intermediate feature values of the first predetermined number p of points on the second predetermined number m of depthwise convolution output channels, each intermediate feature value is stored in the available space of the memory.

Further, according to the current design parameters of the convolutional layer, at least one of the following operations may be performed for each intermediate feature value after each intermediate feature value is obtained and before it is stored: an activation operation and a quantization operation.

In step S320, pointwise convolution calculations are performed according to the intermediate feature values of the first predetermined number p of points on the second predetermined number m of depthwise convolution output channels and the pointwise convolution kernels, to obtain the current pointwise convolution partial sums of the first predetermined number p of points on all the pointwise convolution output channels.

In an example, the step S320 may comprise:

Substep 1: performing the pointwise convolution calculations according to intermediate feature values of the first predetermined number p of points on the third predetermined number m' of depthwise convolution output channels and weight values on the corresponding third predetermined number m' of pointwise convolution channels in all pointwise convolution kernels, respectively, to obtain the current pointwise convolution sub-partial sums of the first predetermined number p of points on all pointwise convolution output channels.

For example, in substep 1, the following steps may be performed: (1) performing the pointwise convolution calculations according to the intermediate feature values of the first predetermined number p of points on the third predetermined number m' of depthwise convolution output channels and weight values on the corresponding third predetermined number m' of pointwise convolution channels in a fourth predetermined number n of pointwise convolution kernels, to obtain the current pointwise convolution sub-partial sums of the first predetermined number p of points on the fourth predetermined number n of pointwise convolution output channels corresponding to the fourth predetermined number n of pointwise convolution kernels.

For example, the third predetermined number m' and the fourth predetermined number n may be determined according to the number of pointwise convolution calculation units and the first predetermined number p.

For example, the operation (1) may comprise: (1-1) reading the intermediate feature values of the first predetermined number p of points on the third predetermined number m' of depthwise convolution output channels from the intermediate feature values of the first predetermined number p of points on the second predetermined number m of depthwise convolution output channels; (1-2) reading the weight values on the corresponding third predetermined number m' of pointwise convolution channels in the fourth predetermined number n of pointwise convolution kernels correspondingly to the intermediate feature values of the first predetermined number p of points on the third predetermined number m' of depthwise convolution output channels; (1-3) respectively performing the pointwise convolution calculations on the intermediate feature values of the first predetermined number p of points on the third predetermined number m' of depthwise convolution output channels with the weight values on the corresponding third predetermined number m' of pointwise convolution channels in the fourth predetermined number n of pointwise convolution kernels, to obtain the current pointwise convolution sub-partial sums of the first predetermined number p of points on the fourth predetermined number n of pointwise convolution output channels corresponding to the fourth predetermined number n of pointwise convolution kernels.

Specifically, in (1-3), the following operations may be performed for each of the first predetermined number p of points: performing multiplication calculations on the intermediate feature values of the point on the third predetermined number m' of depthwise convolution output channels with the weight values on the corresponding third predetermined number m' of pointwise convolution channels in the fourth predetermined number n of pointwise convolution kernels, respectively, to obtain the results of a fourth predetermined number n of groups, each group of which comprise third predetermined number m'0 of multiplication calculation results; and respectively adding the third predetermined number m' of multiplication calculation results in the results of each group of the results of the fourth predetermined number n of groups, to obtain the current pointwise convolution sub-partial sums for this point on the fourth predetermined number n of pointwise convolution output channels corresponding to the fourth predetermined number n of pointwise convolution kernels.

(2) Repeating the above operations by performing the pointwise convolution calculations on the intermediate feature values of the first predetermined number p of points on the third predetermined number m' of depthwise convolution output channels with the weight values on the corresponding third predetermined number m' of pointwise convolution channels in the next fourth predetermined number n of pointwise convolution kernels, to obtain the current pointwise convolution sub-partial sums of the first predetermined number p of points on the next fourth predetermined number n of pointwise convolution output channels corresponding to the next fourth predetermined number n of pointwise convolution kernels, until the current pointwise convolution sub-partial sums of the first predetermined number p of points on all pointwise convolutional output channels are obtained.

Substep 2: respectively performing accumulation calculations on the current pointwise convolution sub-partial sums of the first predetermined number p of points on all pointwise convolution output channels and the previous accumulation calculation sub-results of the first predetermined number p of points, to generate the current accumulation calculation sub-results of the first predetermined number p of points.

For example, after generating current accumulation calculation sub-results of the first predetermined number p of points, the current accumulation calculation sub-results may be stored in the memory to cover the previous accumulation calculation sub-results of the first predetermined number p of points.

Substep 3: repeating the above operations by performing the pointwise convolution calculations according to the intermediate feature values of the first predetermined number p of points on the next third predetermined number m' of depthwise convolution output channels with the weight values on the corresponding next third predetermined number m' pointwise convolution channels in all pointwise convolution kernels, respectively, and correspondingly performing the subsequent operation, until the pointwise convolution calculations and accumulation calculations are completed on all of the intermediate feature values of the first predetermined number p of points on the second predetermined number m of depthwise convolution output channels, the final accumulation calculation sub-results of the first predetermined number p of points being the current pointwise convolution partial sums of the first predetermined number p of points on all pointwise convolution output channels.

Substeps 1-3 of step S320 are substantially similar to steps S223-S225 of step S220 in the second embodiment, and thus the detailed description thereof is omitted.

For example, at the first execution, firstly, the intermediate feature values of p points on the former m' depthwise convolution output channels may be read from the intermediate feature map obtained by depthwise convolution calculations. Then, the weight values on the former of pointwise convolution channels may be read from the former n pointwise convolution kernels in the N pointwise convolution kernels. Next, the pointwise convolution sub-partial sums on the former n pointwise convolution output channels may be calculated according to the both. Then, the pointwise convolution sub-partial sums on the latter n pointwise convolution output channels is calculated, until the pointwise convolution sub-partial sums on the N pointwise convolution output channels is obtained. Next, the sub-partial sums are accumulated, and the intermediate feature values of p points on the latter m' channels are read, and the above operations are repeated to obtain the current pointwise convolution partial sums of p points on all of the pointwise convolution output channels.

It should be noted that what is described herein is that iteration is firstly performed on the dimension (n) of the number of the pointwise convolution kernels and then iteration is performed on the dimension (m) of the number of channels, however, embodiments of the present disclosure are not limited to it. For example, the iteration may also be performed on the dimension (m) of the number of channels, and then the iteration is performed on the dimension (n) of the number of the pointwise convolution kernels.

In a simple case, if m'=m, then at the first execution, firstly, the intermediate feature values of p points on the first m channels may be read, as shown in the intermediate feature map (i=1) in FIG. 14. Then, the weight values an the former m pointwise convolution channels in the N pointwise convolution kernels may be read, as shown in the pointwise convolution kernel (i=1) in FIG. 14. Next, the current pointwise convolution partial sums may be calculated according to the both, as shown in the output feature map (i=1) in FIG. 14.

In step S330, accumulation calculations are respectively performed on the current pointwise convolution partial sums of the first predetermined number p of points on all pointwise convolution output channels and the previous accumulation calculation results of the first predetermined number p of points, to generate the current accumulation calculation results of the first predetermined number p of points.

For example, after generating the current accumulation calculation sub-results of the first predetermined number p of points, the current accumulation calculation results are stored in the memory to cover the previous accumulation calculation results of the first predetermined number p of points.

In step S340, the above operations are repeated, and the pointwise convolution calculations are performed according to the intermediate feature values of the first predetermined number p of points on the next second predetermined number m of depthwise convolution output channels and the pointwise convolution channels, and the subsequent operations are correspondingly performed, until the pointwise convolution calculations and accumulation calculations are completed on all of the intermediate feature values of the first predetermined number p of points on all depthwise convolution output channels, and the final accumulation calculation results of the first predetermined number p of points being the output feature values of the first predetermined number p of points on all pointwise convolution output channels.

For example, next, the intermediate feature map (i=2) may be calculated according to the input feature map (i=2) and the depthwise convolution kernel (i=2), then, the current pointwise convolution partial sums may be calculated according to the intermediate feature map (i=2) and the pointwise convolution kernel (i–2), as shown in the output feature map (i=2) in FIG. 14, next, the output feature map (i=2) is accumulated with the previous accumulation calculation results (i.e. the output feature map (i=1) in FIG. 14) to generate the current accumulation calculation results. In a similar fashion, the intermediate feature map (i=z) may be calculated according to the input feature map (i=z) and the depthwise convolution kernel (i=z), and then, the current pointwise convolution partial sums may be calculated according to the intermediate feature map (i=z) and the pointwise convolution kernel (i=z) as shown in the output feature map (i=z) in FIG. 14, next, the output feature map (i=z) is accumulated with the previous accumulation calculation results (i.e. the current pointwise convolution partial sums (1) to the current pointwise convolution partial sums (z'–1)), such that an output feature map including the output feature values as the final output results of the pointwise convolution operation are obtained, as shown in the output feature diagram in FIG. 8, the size of which are p points and have a total of N channels.

For example, at least one of an activation operation and a quantization operation may be performed on each output feature value before the final accumulation calculation results of the first predetermined number p of points are stored in the memory as the output feature value of the first predetermined number p of points on all pointwise convolution output channels.

Hereinafter, the convolution calculation method according to the first embodiment of the present disclosure will be explained in a specific example.

For example, as shown in FIG. 14, assuming that the width and height dimensions of the depthwise convolution are S*R, the number of channels (or may also be regarded as number when the channel number is considered to be 1) is M, the width and height dimensions of the depthwise convolution are 1*1, the number of channels is M, and the number is N, the width and height dimensions of the input feature map are X*Y, the width and height dimensions of the intermediate feature map are W*H, and the width and height dimensions of the output feature map are E*F, then the convolution calculation method may comprise the following steps:

1. For the depthwise convolution, firstly, calculating the multiplication and accumulation results of p(p<=H*W) points and m(m<=M) channels, the accumulation here being the accumulation performed in the direction of the length and width of the convolution kernel, as R and S shown in FIG. 6, and p*m multiply-accumulate (MAC) units being shared here, and p*m multiply-accumulate results being obtained.

As shown in FIG. 9, it is assumed that there are 512 multiplier adder units (MACs), and 32 points (the abovementioned p=32), 16 channels (the abovementioned m=16, i.e. the channel variable c takes a value from the range of 0 to 15) are simultaneously calculated at a time. Assuming that the size of the convolution kernel is 3*3, then, after 9 times of multiplication and accumulation calculations (Mult and Accu) (the height and width variables r and s of the depthwise convolution kernel changes from 0 to 2, respectively, the width variable x of the input feature map changes from 0-31 to 2-33, and the height variable y changes from 0 to 2), the output values of 32 points, 16 channels will be obtained.

2. Performing an optional activation operation on the results of abovementioned step 1, the activation operation referring to remapping the numerical with a nonlinear function, the activation functions including but not limited to ReLu function, Sigmoid function, arctangent (tan) function, etc.

3. Performing an optional quantization operation on the results of the abovementioned step 2, the quantization operation referring to obtaining the multiplication and accumulation results having low precision (usually 8 bit) by shifting or multiplying and dividing the multiplication and accumulation results having high precision (usually 32 bit).

4. Storing the results of abovementioned step 3 in a register or on-chip SRAM.

5. Directly performing pointwise calculations for the results of abovementioned step 4, reading the results of depthwise convolution calculations of p points, m channels from the register or the on-chip SRAM, and calculating the multiplication and accumulation results of p points, m channels, the accumulation here being the accumulation in the channel direction, to obtain the pointwise convolution partial sums of p points, 1 output channel (the partial sums from the first to m-th input channels).

6. Storing the results of abovementioned step 5 in the register or on-chip SRAM.

7. Completing the calculation and storage of the pointwise convolution partial sums of p points, N output channels (the partial sums of the first to m-th input channels) by circulating N times of operations of step 5 and step 6, assuming that pointwise convolution have a total of n convolution kernels, the results of the partial sums of the p output points on the N output channels being stored in the register or on-chip SRAM.

As shown in FIG. 10, the size of the convolution kernel of the Pointwise convolution is 1*1, and it is also assumed that there are 512 multiplier adder units (the 512 multiplier adder units here and the 512 multiplier adder units of the Depthwise calculation process may be the same 512 multiplier adder units, or may be different), and a convolution of calculates 32 points (the abovementioned p=32), 16 channels (the abovementioned m=16, i.e. the channel variable c takes the value from the range of 0 to 15), 1 convolution kernel each time, and obtains the data of a partial sums of 32 points on 1 output channel. Assuming that there are 256 convolution kernels, then after 256*(128/16)=2048 times of calculations, the data of the partial sums of 32 points on 256 output channels are obtained.

8. Repeating the operations of steps 1-7, continuously calculating to obtain the partial sums of p points on next m output channels (the partial sums on the m+1-th to 2 m-th input channels), and to accumulate these partial sums with the previously stored partial sums and store the accumulation results in the register or on-chip SRAM, in this way, obtaining the final accumulation results of the pointwise convolution of the p output points on the N output channels through [M/m] times of circulation.

9. Performing an optional activation operation on the results of abovementioned step 8, the activation operation referring to remapping the numerical with a nonlinear function, the activation function including but not limited to ReLu function, Sigmoid function, arctangent (tan) function, etc.

10. Performing an optional quantization operation on the results of abovementioned step 9, the quantization operation referring to obtaining the low-precision multiplication and accumulation results (usually 8 bit) by shifting or multiplying and dividing the high-precision multiplication and accumulation results (usually 32 bit).

11. Repeating the above operations of steps 1-10 by continuously calculate next p points until the complete output feature map is obtained.

Compared with the specific example of the first embodiment and the specific example of the third embodiment, it may be seen that if the depthwise convolution has M channels (or when the number of channels is considered to be 1, it may also be regarded as the number), and pointwise convolution has N convolution kernels, then the former solution needs to buffer p*M depthwise convolution result data which are generally quantized (8 bi), and a buffer space of p*M*8 bits is needed. The latter solution needs to buffer p*N partial sums data which are generally high-precision and unquantized (32 bits), and then p*N*32 bits of storage space is required. It may be seen that, in the typical case where the depth wise convolution results are quantized and the partial sums results are not quantized, if M>4n, the latter solution will save more storage space, otherwise the former solution will save more storage space.

Therefore, in an embodiment of the present disclosure, the convolution calculation method in a neural network may further comprise: comparing the number of channels (or number) M of convolution kernels and the number N of pointwise convolution kernels; in response to M>4N, performing the convolution calculation method according to the first embodiment of the present disclosure to calculate the output feature values, otherwise, selecting the convolution calculation method according to the third embodiment of the present disclosure to calculate the output feature values.

Exemplary Electronic Device

Hereinafter, an electronic device according to an embodiment of the present disclosure will be described with reference to FIG. 15.

Figure 15:
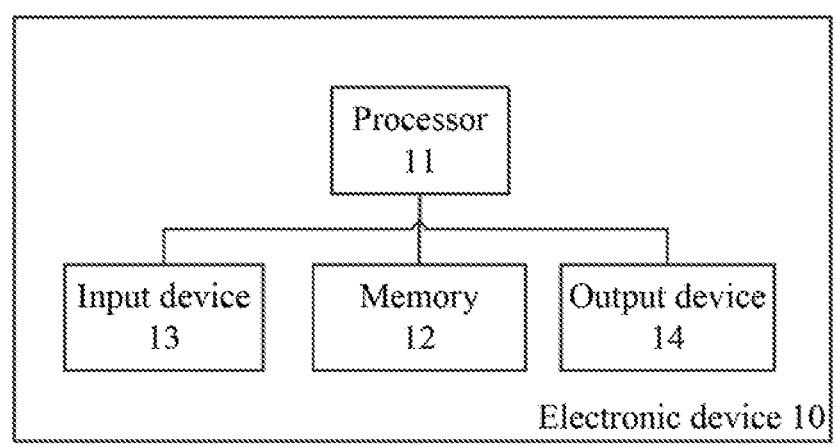
FIG. 15 shows a block diagram of an electronic device according to an embodiment of the present disclosure.

FIG. 15 shows a block diagram of an electronic device according to an embodiment of the present disclosure.

As shown in FIG. 15, an electronic device 10 comprises one or more processors 11 and memories 12.

The processor 11 may be any form of processing unit having data processing capability and/or instruction execution capability, and may control other assembly in the electronic device 10 to perform the desired functions.

The memory 12 may comprise one or more computer program products which may comprise various forms of computer readable and writable storage media, such as a volatile memory and/or a non-volatile memory. The volatile memory may comprise, for example, a random access memory (RAM) and/or a cache, etc. The non-volatile memory may comprise, for example, a read only memory (ROM), a hard disk, a flash memory, etc. One or more computer program instructions may be stored on the computer readable storage medium, and the processor 11 may run the program instructions to implement the convolution calculation method and/or other desired functions in the neural network of various embodiments of the present disclosure as described above.

In one example, the electronic device 10 may also comprise an input device 13 and an output device 14, and these assembly are interconnected by a bus system and/or other form of connection mechanism (not shown).

For example, the input device 13 may comprise, for example, a keyboard, a mouse, and a communication network and remote input devices to which it is connected, and the like.

For example, the output device 14 may comprise, for example, a display, a printer, and a communication network and remote output devices to which it is connected, and the like.

Of course, for simplicity, only some of the assemblies related to the present disclosure in the electronic device 10 are shown in FIG. 15, and assemblies such as a bus, an input/output interface, and the like are omitted. It should be noted that the assemblies and structures of the electronic device 10 shown in FIG. 15 are merely exemplary and not limiting, and the electronic device 10 may have other assemblies and structures as needed.

Exemplary Computer Program Product and Computer Readable and Writable Storage Medium In addition to the methods and apparatus described above, embodiments of the present disclosure may also be a computer program product which comprises computer program instructions, and said computer program instructions, when executed by a processor, make the processor to perform steps in a composite operation method for a neural network according to various embodiments of the present disclosure as described in the abovementioned "exemplary method" portion of the present disclosure.

The computer program product may write program code for performing operations of embodiments of the present disclosure in any combination of one or more programming languages which comprise object-oriented programming languages, such as Java, C++, etc., and conventional procedural programming languages, such as "C" language or similar programming languages. The program code may be executed entirely on a user computing device, be partially executed on a user device, be executed as a stand-alone software package, be partially executed on a user computing device and be partially executed on a remote computing device, or be entirely executed on a remote computing device or server.

Furthermore, embodiments of the present disclosure may also be a computer readable and writable storage medium having computer program instructions stored thereon, and said computer program instructions, when executed by a processor, make the processor to perform steps in a composite operation method for a neural network according to various embodiments of the present disclosure as described in the abovementioned "exemplary method" portion of the present disclosure.

The computer readable and writable storage medium may use any combination of one or more readable and writable media. The readable and writable medium may be a readable and writable signal medium or a readable and writable storage medium. The readable and writable storage medium may comprise, but are not limited to, an electric, a magnetic, an optical, an electromagnetic, an infrared, or a semiconductor system, apparatus, or device, or any combination of the above. More specific examples (a non-exhaustive list) of readable and writable storage medium include an electrical connection with one or more wires, a portable disk, a hard disk, a random access memory (RAM), a read only memory (ROM), an erasable programmable read only memory (EPROM or a flash memory), are optical fiber, a portable compact disk read only memory (CD-ROM), an optical storage device, a magnetic storage device, or any suitable combination of the above.

The basic principles of the present disclosure are described above in conjunction with the specific embodiments. However, it is necessary to point out that the advantages, superiorities, and effects and so on mentioned in the present disclosure are merely examples but not intended to limit the present invention. These advantages, superiorities, effects and so on will not be considered as essential to the embodiments of the present disclosure. In addition, the specific details of the foregoing disclosure are only for the purpose of illustration and ease of understanding but not for the purpose of limitation, and the above details do not limit the application to be implemented in the specific details mentioned above.

The block diagrams of device, apparatus, equipment, system referred to in the present disclosure are merely illustrative examples and are not intended to require or imply that the connections, arrangements, and configurations must be made in the manner shown in the block diagram. It will be appreciated by those skilled in the art that the device, apparatus, equipment, system, may be connected, arranged, or configured in any manner. Terms such as "including", comprising", "having" and the like are open words, which means "including but not limited to" and may be used interchangeably. The terms "or" and "and" as used herein refer to the term "and/or" and may be used interchangeably, unless the context clearly dictates otherwise. The term "such as" as used herein refers to the phrase "such as but not limited to" and is used interchangeably.

It should also be noted that in the apparatus, equipment, and the method of the present disclosure, each component or each step may be decomposed and/or recombined. These decompositions and/or recombination should be regarded as an equivalent of the present disclosure.

The above description of the disclosed aspects is provided to enable any of those skilled in the art to make or use the application. Various modifications to these aspects are very obvious for those skilled in the art, and the generic principles defined herein may be applied to other aspects without departing from the scope of the application. Therefore, the present disclosure is not intended to be limited to the aspects shown herein, but rather to present the broadest scope consistent with the principles and novel features disclosed herein.

The above description has been provided for the purposes of illustration and description. In addition, the description is not intended to limit the embodiments of the present disclosure to the forms disclosed herein. Although various exemplary aspects and embodiments have been discussed above, those skilled in the art will recognize some variant, modification, changes, addition and sub-combination.

What is claimed is:

1. A method for convolution calculation in a neural network, comprising:

reading an input feature map, depthwise convolution kernels and pointwise convolution kernels from a dynamic random access memory (DRAM);

performing depthwise convolution calculations and pointwise convolution calculations by multiplier adder units MAC executing depthwise convolution calculations and multiplier adder units MAC executing pointwise convolution calculations, according to the input feature map, the depthwise convolution kernels and the pointwise convolution kernels to obtain output feature values of a first predetermined number p of points of the input feature map on all pointwise convolution output channels, wherein the first predetermined number p is determined according to at least one of available space in the on-chip memory, number of the multiplier adder units MAC executing the depthwise convolution calculations, height and width, and channel number dimensions of the input feature map;

storing the output feature values of a first predetermined number p of points on all pointwise convolution output channels into an on-chip memory; and repeating above operation to obtain output feature values of all points on all pointwise convolution output channels, wherein the performing step comprises:

performing the depthwise convolution calculations according to the input feature map and the depthwise convolution kernels, to obtain intermediate feature values of the first predetermined number p of points on a second predetermined number m of depthwise convolution output channels;

performing the pointwise convolution calculations according to the intermediate feature values of the first predetermined number p of points on the second predetermined number m of depthwise convolution output channels and the pointwise convolution kernels, to obtain current pointwise convolution partial sums of the first predetermined number p of points on all the pointwise convolution output channels;

respectively performing accumulation calculations on the current pointwise convolution partial sum of the first predetermined number p of points on all pointwise convolution output channels and previous accumulation calculation results of the first predetermined number p of points, so as to generate current accumulation calculation results of the first predetermined number p of points; and repeating the above operations by performing the pointwise convolution calculations according to intermediate feature values of the first predetermined number p of points on a next second predetermined number m of depthwise convolution output channels and the pointwise convolution kernels, and correspondingly performing subsequent operations, until the pointwise convolution calculations and accumulation calculations are completed on all of the intermediate feature values of the first predetermined number p of points on all depthwise convolution output channels, the final accumulation calculation results of the first predetermined number p of points being output feature values of the first predetermined number p of points on all pointwise convolution output channels, wherein performing the pointwise convolution calculations according to the intermediate feature values of the first predetermined number p of points on the second predetermined number m of depthwise convolution output channels and the pointwise convolution kernels, to obtain current pointwise convolution partial sums of the first predetermined number p of points on all the pointwise convolution output channels comprises:

performing the pointwise convolution calculations according to intermediate feature values of the first predetermined number p of points on a third predetermined number m' of depthwise convolution output channels with weight values on a corresponding third predetermined number m' of pointwise convolution channels in all pointwise convolution kernels, respectively, to obtain current pointwise convolution sub-partial sums of the first predetermined number p of points on all pointwise convolution output channels;

respectively performing accumulation calculations on the current pointwise convolution sub-partial sums of the first predetermined number p of points on all pointwise convolution output channels and the previous accumulation calculation sub-results of the first predetermined number p of points, to generate the current accumulation calculation sub-results of the first predetermined number p of points; and repeating the above operations by performing the pointwise convolution calculations according to intermediate feature values of the first predetermined number p of points on a next third predetermined number m' of depthwise convolution output channels with weight values on a corresponding next third predetermined number m' of pointwise convolution channels in all pointwise convolution kernels, respectively, and correspondingly performing subsequent operations, until the pointwise convolution calculations and accumulation calculations are completed on all of intermediate feature values of the first predetermined number p of points on the second predetermined number m of depthwise convolution output channels, the final accumulation calculation sub-results of the first predetermined number p of points being the current pointwise convolution partial sums of the first predetermined number p of points on all pointwise convolution output channels, wherein performing the pointwise convolution calculations according to intermediate feature values of the first predetermined number p of points on a third predetermined number m' of depthwise convolution output channels with weight values on a corresponding third predetermined number m' of pointwise convolution channels in all pointwise convolution kernels, respectively, to obtain a current pointwise convolution sub-partial sums of the first predetermined number p of points on all pointwise convolution output channels comprises:

performing the pointwise convolution calculations according to the intermediate feature values of the first predetermined number p of points on the third predetermined number m' of depthwise convolution output channels with weight values on the corresponding third predetermined number m' of pointwise convolution channels in a fourth predetermined number n of pointwise convolution kernels, to obtain current pointwise convolution sub-partial sums of the first predetermined number p of points on a fourth predetermined number n of pointwise convolution output channels corresponding to the fourth predetermined number n of pointwise convolution kernels, and repeating the above operations by performing the pointwise convolution calculations on the intermediate feature values of the first predetermined number p of points on the third predetermined number m' of depthwise convolution output channels with weight values on the corresponding third predetermined number m' of pointwise convolution channels in a next fourth predetermined number n of pointwise convolution kernels, to obtain current pointwise convolution sub-partial sums of the first predetermined number p of points on a next fourth predetermined number n of pointwise convolution output channels corresponding to the next fourth predetermined number n of pointwise convolution kernels, until the current pointwise convolution sub-partial sums of the first predetermined number p of points on all pointwise convolutional output channels, wherein performing the pointwise convolution calculations according to the intermediate feature values of the first predetermined number p of points on the third predetermined number m' of depthwise convolution output channels with weight values on the corresponding third predetermined number m' of pointwise convolution channels in a fourth predetermined number n of pointwise convolution kernels, to obtain the current pointwise convolution sub-partial sum of the first predetermined number p of points on a fourth predetermined number n of pointwise convolution output channels corresponding to the fourth predetermined number n of pointwise convolution kernels comprises:

reading the intermediate feature values of the first predetermined number p of points on the third predetermined number m' of depthwise convolution output channels from the intermediate feature values of the first predetermined number p of points on the second predetermined number m of depthwise convolution output channels;

reading weight values on the corresponding third predetermined number m' of pointwise convolution channels in the fourth predetermined number n of pointwise convolution kernels correspondingly to the intermediate feature values of the first predetermined number p of points on the third predetermined number m' of depthwise convolution output channels; and respectively performing the pointwise convolution calculations on the intermediate feature values of the first predetermined number p of points on the third predetermined number m' of depthwise convolution output channels and weight values on the corresponding third predetermined number m' of pointwise convolution channels in the fourth predetermined number n of pointwise convolution kernels, to obtain a current pointwise convolution sub-partial sums of the first predetermined number p of points on a fourth predetermined number n of pointwise convolution output channels corresponding to the fourth predetermined number n of pointwise convolution kernels, wherein respectively performing the pointwise convolution calculations on the intermediate feature values of the first predetermined number p of points on the third predetermined number m' of depthwise convolution output channels and weight values on the corresponding third predetermined number m' of pointwise convolution channels in the fourth predetermined number n of pointwise convolution kernels, to obtain a current pointwise convolution sub-partial sums of the first predetermined number p of points on a fourth predetermined number n of pointwise convolution output channels corresponding to the fourth predetermined number n of pointwise convolution kernels comprises:

performing following operations on each point of the first predetermined number p of points:

respectively performing multiplication calculations on the intermediate feature values of the point on the third predetermined number m' of depthwise convolution output channels with weight values on the corresponding third predetermined number m' of pointwise convolution channels in the fourth predetermined number n of pointwise convolution kernels, to obtain a fourth predetermined number n of groups of results, each group of which comprise a third predetermined number m' of multiplication calculation results; and respectively adding the third predetermined number m' of multiplication calculation results of each group of results in the fourth predetermined number n of groups of results, to obtain current pointwise convolution sub-partial sums of the point on the fourth predetermined number n of pointwise convolution output channels corresponding to the fourth predetermined number n of pointwise convolution kernels.

2. The method of claim 1, wherein the second predetermined number m is determined according to a number of the multiplier adder units executing the depthwise convolution calculations and the first predetermined number p.

3. The method of claim 1, wherein performing the depthwise convolution calculations according to the input feature map and the depthwise convolution kernels, to obtain intermediate feature values of the first predetermined number p of points on a next second predetermined number m of depthwise convolution output channels comprises:

reading input feature values of a first predetermined number p of groups of points on a second predetermined number m of input channels from the input feature map;

reading weight values in corresponding second predetermined number m of depthwise convolution kernels corresponding to the input feature values of the first predetermined number p of groups of points on the second predetermined number m of input channels; and respectively performing the depthwise convolution calculations on the input feature values of the first predetermined number p of groups of points on the second predetermined number m of input channels with weight values in the corresponding second predetermined number m of depthwise convolution kernels to obtain intermediate feature values of the first predetermined number p of points respectively corresponding to the first predetermined number p of groups of points on the second predetermined number m of depthwise convolution output channels.

4. The method of claim 3, further comprising:

concurrent with the step of performing the pointwise convolution calculations, reading the input feature values of the first predetermined number p of groups of points on the second predetermined number m of input channels from the input feature map and the corresponding weight values.

5. The method of claim 3 wherein reading input feature values of a first predetermined number p of groups of points on a second predetermined number m of input channels from the input feature map comprises:

reading the input feature values of the first predetermined number p of groups of points on the second predetermined number m of input channels from the input feature map, each group of points having a width and a height equal to a width and a height of the weight values in the depthwise convolution kernel, and two adjacent groups of points having a stride equal to a stride of the depthwise convolutional calculation.

6. The method of claim 3 wherein respectively performing the depthwise convolution calculations on the input feature values of the first predetermined number p of groups of points on the second predetermined number m of input channels with weight values in the corresponding second predetermined number m of depthwise convolution kernel to obtain intermediate feature values of the first predetermined number p of points respectively corresponding to the first predetermined number p of groups of points on the second predetermined number m of depthwise convolution output channels comprises:

performing following operations for each group of points in the first predetermined number p of groups of points:

respectively performing multiplication calculations on the input feature values of one point in the group of points on the second predetermined number m of input channels and a corresponding weight value in the corresponding second predetermined number m of depthwise convolution kernel, to obtain current multiplication calculation results of the group of points;

respectively performing accumulation calculations on the current multiplication calculation results of the group of points and previous multiplication calculation results of the group of points, to generate current accumulation calculation results of the group of points; and repeating the above operations by respectively performing multiplication calculations on input feature values of a next point of the group of points on the second predetermined number m of input channels and a corresponding next one weight value in the corresponding second predetermined number m of depthwise convolution kernels and correspondingly performing subsequent operations, until the multiplication calculations and accumulation calculations are completed on the input feature values of all points of the group of points on the second predetermined number m of input channels, the final accumulation calculation results of the group of points being intermediate feature values of one point corresponding to the group of points on the second predetermined number m of depthwise convolution output channels.

7. The method of claim 1, further comprising:

storing each intermediate feature value in the on-chip memory after obtaining the intermediate feature values of the first predetermined number p of points on the second predetermined number m of depthwise convolution output channels.

8. The method of claim 7, further comprising:
performing at least one of an activation operation and a quantization operation on each intermediate feature value before storing it in the on-chip memory.

9. The method of claim 1 wherein the third predetermined number m' and the fourth preset number n are determined according to a number of the multiplier adder units MAC executing the pointwise convolution calculations and the first predetermined number p.

10. The method of claim 8, further comprising:
storing the current accumulation calculation sub-results of the first predetermined number p of points in the on-chip memory after generating the current accumulation calculation sub-results, to cover the previous accumulation calculation sub-results of the first predetermined number p of points.

11. The method of claim 1, further comprising:
storing the current accumulation calculation results of the first predetermined number p of points in the on-chip memory after generating the current accumulation calculation results, to cover the previous accumulation calculation results of the first predetermined number p of points.

12. The method of claim 11, further comprising:
performing at least one of an activation operation and a quantization operation on each output feature value before storing the final accumulation calculation results of the first predetermined number p of points in the on-chip memory as output feature values of the first predetermined number p of points on all pointwise convolution output channels.

13. An electronic device, comprising:
a processor; and
a memory having computer program instructions stored therein, when executed by the processor, making the processor to perform a method for convolution calculation in a neural network comprising:
    reading an input feature map, depthwise convolution kernels and pointwise convolution kernels from a dynamic random access memory (DRAM);
    performing depthwise convolution calculations and pointwise convolution calculations by multiplier adder units MAC executing depthwise convolution calculations and multiplier adder units MAC executing pointwise convolution calculations, according to the input feature map, the depthwise convolution kernels and the pointwise convolution kernels to obtain output feature values of a first predetermined number p of points of the input feature map on all pointwise convolution output channels, wherein the first predetermined number p is determined according to at least one of available space in the on-chip memory, number of the multiplier adder units MAC executing the depthwise convolution calculations, height and width, and channel number dimensions of the input feature map;
    storing the output feature values of a first predetermined number p of points on all pointwise convolution output channels into an on-chip memory; and
    repeating above operation to obtain output feature values of all points on all pointwise convolution output channels,
wherein the performing step comprises:
    performing the depthwise convolution calculations according to the input feature map and the depthwise convolution kernels, to obtain intermediate feature values of the first predetermined number p of points on a second predetermined number m of depthwise convolution output channels;
    performing the pointwise convolution calculations according to the intermediate feature values of the first predetermined number p of points on the second predetermined number m of depthwise convolution output channels and the pointwise convolution kernels, to obtain current pointwise convolution partial sums of the first predetermined number p of points on all the pointwise convolution output channels;
    respectively performing accumulation calculations on the current pointwise convolution partial sum of the first predetermined number p of points on all pointwise convolution output channels and previous accumulation calculation results of the first predetermined number p of points, so as to generate current accumulation calculation results of the first predetermined number p of points; and
    repeating the above operations by performing the pointwise convolution calculations according to intermediate feature values of the first predetermined number p of points on a next second predetermined number m of depthwise convolution output channels and the pointwise convolution kernels, and correspondingly performing subsequent operations, until the pointwise convolution calculations and accumulation calculations are completed on all of the intermediate feature values of the first predetermined number p of points on all depthwise convolution output channels, the final accumulation calculation results of the first predetermined number p of points being output feature values of the first predetermined number p of points on all pointwise convolution output channels,
wherein performing the pointwise convolution calculations according to the intermediate feature values of the first predetermined number p of points on the second predetermined number m of depthwise convolution output channels and the pointwise convolution kernels, to obtain current pointwise convolution partial sums of the first predetermined number p of points on all the pointwise convolution output channels comprises:
    performing the pointwise convolution calculations according to intermediate feature values of the first predetermined number p of points on a third predetermined number m' of depthwise convolution output channels with weight values on a corresponding third predetermined number m' of pointwise convolution channels in all pointwise convolution kernels, respectively, to obtain current pointwise convolution sub-partial sums of the first predetermined number p of points on all pointwise convolution output channels;
    respectively performing accumulation calculations on the current pointwise convolution sub-partial sums of the first predetermined number p of points on all pointwise convolution output channels and the previous accumulation calculation sub-results of the first predetermined number p of points, to generate the current accumulation calculation sub-results of the first predetermined number p of points; and
    repeating the above operations by performing the pointwise convolution calculations according to intermediate feature values of the first predetermined number p of points on a next third predetermined number m' of depthwise convolution output channels with weight values on a corresponding next third predetermined number m' of pointwise convolution channels in all pointwise convolution kernels, respectively, and correspondingly performing subsequent operations, until the pointwise convolution calculations and accumulation calculations are completed on all of intermediate feature values of the first predetermined number p of points on the second predetermined number m of depthwise convolution output channels, the final accumulation calculation sub-results of the first predetermined number p of points being the current pointwise convolution partial sums of the first predetermined number p of points on all pointwise convolution output channels, wherein performing the pointwise convolution calculations according to intermediate feature values of the first predetermined number p of points on a third predetermined number m' of depthwise convolution output channels with weight values on a corresponding third predetermined number m' of pointwise convolution channels in all pointwise convolution kernels, respectively, to obtain a current pointwise convolution sub-partial sums of the first predetermined number p of points on all pointwise convolution output channels comprises:

performing the pointwise convolution calculations according to the intermediate feature values of the first predetermined number p of points on the third predetermined number m' of depthwise convolution output channels with weight values on the corresponding third predetermined number m' of pointwise convolution channels in a fourth predetermined number n of pointwise convolution kernels, to obtain current pointwise convolution sub-partial sums of the first predetermined number p of points on a fourth predetermined number n of pointwise convolution output channels corresponding to the fourth predetermined number n of pointwise convolution kernels, and repeating the above operations by performing the pointwise convolution calculations on the intermediate feature values of the first predetermined number p of points on the third predetermined number m' of depthwise convolution output channels with weight values on the corresponding third predetermined number m' of pointwise convolution channels in a next fourth predetermined number n of pointwise convolution kernels, to obtain current pointwise convolution sub-partial sums of the first predetermined number p of points on a next fourth predetermined number n of pointwise convolution output channels corresponding to the next fourth predetermined number n of pointwise convolution kernels, until the current pointwise convolution sub-partial sums of the first predetermined number p of points on all pointwise convolutional output channels, wherein performing the pointwise convolution calculations according to the intermediate feature values of the first predetermined number p of points on the third predetermined number m' of depthwise convolution output channels with weight values on the corresponding third predetermined number m' of pointwise convolution channels in a fourth predetermined number n of pointwise convolution kernels, to obtain the current pointwise convolution sub-partial sum of the first predetermined number p of points on a fourth predetermined number n of pointwise convolution output channels corresponding to the fourth predetermined number n of pointwise convolution kernels comprises:

reading the intermediate feature values of the first predetermined number p of points on the third predetermined number m' of depthwise convolution output channels from the intermediate feature values of the first predetermined number p of points on the second predetermined number m of depthwise convolution output channels;

reading weight values on the corresponding third predetermined number m' of pointwise convolution channels in the fourth predetermined number n of pointwise convolution kernels correspondingly to the intermediate feature values of the first predetermined number p of points on the third predetermined number m' of depthwise convolution output channels; and respectively performing the pointwise convolution calculations on the intermediate feature values of the first predetermined number p of points on the third predetermined number m' of depthwise convolution output channels and weight values on the corresponding third predetermined number m' of pointwise convolution channels in the fourth predetermined number n of pointwise convolution kernels, to obtain a current pointwise convolution sub-partial sums of the first predetermined number p of points on a fourth predetermined number n of pointwise convolution output channels corresponding to the fourth predetermined number n of pointwise convolution kernels, wherein respectively performing the pointwise convolution calculations on the intermediate feature values of the first predetermined number p of points on the third predetermined number m' of depthwise convolution output channels and weight values on the corresponding third predetermined number m' of pointwise convolution channels in the fourth predetermined number n of pointwise convolution kernels, to obtain a current pointwise convolution sub-partial sums of the first predetermined number p of points on a fourth predetermined number n of pointwise convolution output channels corresponding to the fourth predetermined number n of pointwise convolution kernels comprises:

performing following operations on each point of the first predetermined number p of points;

respectively performing multiplication calculations on the intermediate feature values of the point on the third predetermined number m' of depthwise convolution output channels with weight values on the corresponding third predetermined number m' of pointwise convolution channels in the fourth predetermined number n of pointwise convolution kernels, to obtain a fourth predetermined number n of groups of results, each group of which comprise a third predetermined number m' of multiplication calculation results; and respectively adding the third predetermined number m' of multiplication calculation results of each group of results in the fourth predetermined number n of groups of results. to obtain current pointwise convolution sub-partial sums of the point on the fourth predetermined number n of pointwise convolution output channels corresponding to the fourth predetermined number n of pointwise convolution kernels.

14. A non-transitory computer-readable storage medium having computer program instructions stored thereon, when executed by the processor, making a processor to perform a method for convolution calculation in a neural network comprising:

reading an input feature map, depthwise convolution kernels and pointwise convolution kernels from a dynamic random access memory (DRAM);

performing depthwise convolution calculations and pointwise convolution calculations by multiplier adder units executing depthwise convolution calculations and multiplier adder units executing pointwise convolution calculations, according to the input feature map, the depthwise convolution kernels and the pointwise convolution kernels to obtain output feature values of a first predetermined number p of points of the input feature map on all pointwise convolution output channels, wherein the first predetermined number p is determined according to at least one of available space in the on-chip memory, number of the multiplier adder units executing the depthwise convolution calculations, height and width, and channel number dimensions of the input feature map;

storing the output feature values of a first predetermined number p of points on all pointwise convolution output channels into an on-chip memory; and repeating above operation to obtain output feature values of all points on all pointwise convolution output channels, wherein the performing step comprises:

performing the depthwise convolution calculations according to the input feature map and the depthwise convolution kernels, to obtain intermediate feature values of the first predetermined number p of points on a second predetermined number m of depthwise convolution output channels;

performing the pointwise convolution calculations according to the intermediate feature values of the first predetermined number p of points on the second predetermined number m of depthwise convolution output channels and the pointwise convolution kernels, to obtain current pointwise convolution partial sums of the first predetermined number p of points on all the pointwise convolution output channels;

respectively performing accumulation calculations on the current pointwise convolution partial sum of the first predetermined number p of points on all pointwise convolution output channels and previous accumulation calculation results of the first predetermined number p of points, so as to generate current accumulation calculation results of the first predetermined number p of points; and repeating the above operations by performing the pointwise convolution calculations according to intermediate feature values of the first predetermined number p of points on a next second predetermined number m of depthwise convolution output channels and the pointwise convolution kernels, and correspondingly performing subsequent operations, until the pointwise convolution calculations and accumulation calculations are completed on all of the intermediate feature values of the first predetermined number p of points on all depthwise convolution output channels, the final accumulation calculation results of the first predetermined number p of points being output feature values of the first predetermined number p of points on all pointwise convolution output channels, wherein performing the pointwise convolution calculations according to the intermediate feature values of the first predetermined number p of points on the second predetermined number m of depthwise convolution output channels and the pointwise convolution kernels, to obtain current pointwise convolution partial sums of the first predetermined number p of points on all the pointwise convolution output channels comprises:

performing the pointwise convolution calculations according to intermediate feature values of the first predetermined number p of points on a third predetermined number m' of depthwise convolution output channels with weight values on a corresponding third predetermined number m' of pointwise convolution channels in all pointwise convolution kernels, respectively, to obtain current pointwise convolution sub-partial sums of the first predetermined number p of points on all pointwise convolution output channels;

respectively performing accumulation calculations on the current pointwise convolution sub-partial sums of the first predetermined number p of points on all pointwise convolution output channels and the previous accumulation calculation sub-results of the first predetermined number p of points, to generate the current accumulation calculation sub-results of the first predetermined number p of points; and repeating the above operations by performing the pointwise convolution calculations according to intermediate feature values of the first predetermined number p of points on a next third predetermined number m' of depthwise convolution output channels with weight values on a corresponding next third predetermined number m' of pointwise convolution channels in all pointwise convolution kernels, respectively, and correspondingly performing subsequent operations, until the pointwise convolution calculations and accumulation calculations are completed on all of intermediate feature values of the first predetermined number p of points on the second predetermined number m of depthwise convolution output channels, the final accumulation calculation sub-results of the first predetermined number p of points being the current pointwise convolution partial sums of the first predetermined number p of points on all pointwise convolution output channels, wherein performing the pointwise convolution calculations according to intermediate feature values of the first predetermined number p of points on a third predetermined number m' of depthwise convolution output channels with weight values on a corresponding third predetermined number m' of pointwise convolution channels in all pointwise convolution kernels, respectively, to obtain a current pointwise convolution sub-partial sums of the first predetermined number p of points on all pointwise convolution output channels comprises:

performing the pointwise convolution calculations according to the intermediate feature values of the first predetermined number p of points on the third predetermined number m' of depthwise convolution output channels with weight values on the corresponding third predetermined number m' of pointwise convolution channels in a fourth predetermined number n of pointwise convolution kernels, to obtain current pointwise convolution sub-partial sums of the first predetermined number p of points on a fourth predetermined number n of pointwise convolution output channels corresponding to the fourth predetermined number n of pointwise convolution kernels, and repeating the above operations by performing the pointwise convolution calculations on the intermediate feature values of the first predetermined number p of points on the third predetermined number m' of depthwise convolution output channels with weight values on the corresponding third predetermined number m' of pointwise convolution channels in a next fourth predetermined number n of pointwise convolution kernels, to obtain current pointwise convolution sub-partial sums of the first predetermined number p of points on a next fourth predetermined number n of pointwise convolution output channels corresponding to the next fourth predetermined number n of pointwise convolution kernels, until the current pointwise convolution sub-partial sums of the first predetermined number p of points on all pointwise convolutional output channels, wherein performing the pointwise convolution calculations according to the intermediate feature values of the first predetermined number p of points on the third predetermined number m' of depthwise convolution output channels with weight values on the corresponding third predetermined number m' of pointwise convolution channels in a fourth predetermined number n of pointwise convolution kernels, to obtain the current pointwise convolution sub-partial sum of the first predetermined number p of points on a fourth predetermined number n of pointwise convolution output channels corresponding to the fourth predetermined number n of pointwise convolution kernels comprises:

reading the intermediate feature values of the first predetermined number p of points on the third predetermined number m' of depthwise convolution output channels from the intermediate feature values of the first predetermined number p of points on the second predetermined number m of depthwise convolution output channels;

reading weight values on the corresponding third predetermined number m' of pointwise convolution channels in the fourth predetermined number n of pointwise convolution kernels correspondingly to the intermediate feature values of the first predetermined number p of points on the third predetermined number m' of depthwise convolution output channels; and respectively performing the pointwise convolution calculations on the intermediate feature values of the first predetermined number p of points on the third predetermined number m' of depthwise convolution output channels and weight values on the corresponding third predetermined number m' of pointwise convolution channels in the fourth predetermined number n of pointwise convolution kernels, to obtain a current pointwise convolution sub-partial sums of the first predetermined number p of points on a fourth predetermined number n of pointwise convolution output channels corresponding to the fourth predetermined number n of pointwise convolution kernels, wherein respectively performing the pointwise convolution calculations on the intermediate feature values of the first predetermined number p of points on the third predetermined number m' of depthwise convolution output channels and weight values on the corresponding third predetermined number m' of pointwise convolution channels in the fourth predetermined number n of pointwise convolution kernels, to obtain a current pointwise convolution sub-partial sums of the first predetermined number p of points on a fourth predetermined number n of pointwise convolution output channels corresponding to the fourth predetermined number n of pointwise convolution kernels comprises:

performing following operations on each point of the first predetermined number p of points:

respectively performing multiplication calculations on the intermediate feature values of the point on the third predetermined number m' of depthwise convolution output channels with weight values on the corresponding third predetermined number m' of pointwise convolution channels in the fourth predetermined number n of pointwise convolution kernels, to obtain a fourth predetermined number n of groups of results, each group of which comprise a third predetermined number m' of multiplication calculation results; and respectively adding the third predetermined number m' of multiplication calculation results of each group of results in the fourth predetermined number n of groups of results, to obtain current pointwise convolution sub-partial sums of the point on the fourth predetermined number n of pointwise convolution output channels corresponding to the fourth predetermined number n of pointwise convolution kernels.

* * * * *